US006594620B1

(12) United States Patent
Qin et al.

(10) Patent No.: US 6,594,620 B1
(45) Date of Patent: *Jul. 15, 2003

(54) SENSOR VALIDATION APPARATUS AND METHOD

(75) Inventors: S. Joe Qin, Austin, TX (US); John P. Guiver, Pittsburgh, PA (US)

(73) Assignee: Aspen Technology, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/474,630

(22) Filed: Dec. 29, 1999

Related U.S. Application Data

(63) Continuation-in-part of application No. 09/179,343, filed on Oct. 27, 1998.
(60) Provisional application No. 60/096,872, filed on Aug. 17, 1998.

(51) Int. Cl.[7] .............................................. G06F 11/30
(52) U.S. Cl. ..................... 702/185; 702/183; 714/746
(58) Field of Search ........................... 702/104, 116, 702/179, 181, 182–185, 189, FOR 135, 139, 170, 172; 700/29, 82, 83, 108; 706/15, 46, 51; 376/216, 242; 73/32 A, 861.356, 198; 714/736, 746

(56) References Cited

U.S. PATENT DOCUMENTS

| 4,772,445 A | | 9/1988 | Nasrallah et al. ........... 376/245 |
| 4,996,871 A | * | 3/1991 | Romano ..................... 73/32 A |
| 5,386,373 A | | 1/1995 | Keeler et al. ............... 364/577 |
| 5,442,562 A | | 8/1995 | Hopkins et al. ............ 364/468 |
| 5,459,675 A | | 10/1995 | Gross et al. ................ 364/492 |
| 5,469,447 A | | 11/1995 | Brunemann, Jr. et al. .... 371/36 |
| 5,548,528 A | | 8/1996 | Keeler et al. ............... 364/497 |
| 5,570,300 A | * | 10/1996 | Henry et al. .................. 702/45 |

(List continued on next page.)

FOREIGN PATENT DOCUMENTS

| DE | 41 00 501 A1 | 7/1992 |
| EP | 0 416 370 A2 | 3/1991 |

OTHER PUBLICATIONS

Kramer, Mark, "Nonlinear principal component analysis using autoassociative neural networks", AIChe Journal, 37 (2), pp. 233–243 (1991).

Qin and Dunia, "Determining the number of principal components for best reconstruction", Proc. of the 5–th IFAC Symposium on Dynamics and Control of Process Systems, pp. 359–364, Corfu, Greece (Jun. 8–10, 1998).

Gertler and Singer, "A new structural framework for parity equation based failure detection and isolation", Automatica 26: pp. 381–388 (1990).

(List continued on next page.)

*Primary Examiner*—Marc S. Hoff
*Assistant Examiner*—Mohamed Charioui
(74) *Attorney, Agent, or Firm*—Hamilton, Brook, Smith & Reynolds, P.C.

(57) ABSTRACT

An apparatus and method is disclosed for detecting, identifying, and classifying faults occurring in sensors measuring a process. A variety of process models can be used such as first principles models, dynamic multivariable predictive control models, from data using statistical methods such as partial least squares (PLS) or principal component analysis. If faults are identified in one or more sensors, the apparatus and method provide replacement values for the faulty sensors so that any process controllers and process monitoring systems that use these sensors can remain in operation during the fault period. The identification of faulty sensors is achieved through the use of a set of structured residual transforms that are uniquely designed to be insensitive to specific subsets of sensors, while being maximally sensitive to sensors not in the subset. Identified faults are classified into one of the types Complete Failure, Bias, Drift, Precision Loss, or Unknown.

26 Claims, 19 Drawing Sheets

U.S. PATENT DOCUMENTS

| | | | | |
|---|---|---|---|---|
| 5,586,066 | A | * 12/1996 | White et al. | 702/181 |
| 5,629,872 | A | 5/1997 | Gross et al. | 364/554 |
| 5,661,735 | A | 8/1997 | Fischer | 371/49.1 |
| 5,680,409 | A | 10/1997 | Qin et al. | 371/48 |
| 5,761,090 | A | * 6/1998 | Gross et al. | 714/26 |
| 6,356,857 | B1 | * 3/2000 | Qin et al. | 702/185 |
| 6,311,136 | B1 | * 10/2001 | Henry et al. | 702/45 |

OTHER PUBLICATIONS

Martens, H. and Naes, T., "Multivariate Calibration," John Wiley and Sons, table of contents pp. vii–xiii and p. 158 (1989).

Jackson, J. Edward, A User's Guide to Principal Components,: John Wiley and Sons, Inc., table of contents pp. vii–xiii (1991).

Gertler, J. et al., "Isolation Enhanced Principal Component Analysis," *Proc. IFAC Workshop on On–line Fault Detection and Supervision in the Chemical Process Industries*, Institute Francais du Petrole, Solaize (Lyon) France (Jun. 4–5, 1998).

Gertler, J. and Singer, D., "Augmented Models for Statistical Fault Isolation in Complex Dynamic Systems," *Proc. American Control Conference*, pp. 317–322 (1985).

Benveniste, A. et al., "The Asymptotic Local Approach to Change Detection and Model Validation," *IEEE Trans. Auto. Cont. AC32* (7): 583–592 (Jul. 1987).

Birkes, D. and Dodge, Y., "Alternative Methods of Regression," John Wiley & Sons, Inc., table of contents and chapter 3, pp. 29–55 (1993).

Gertler, J., "Survey of Model–Based Failure Detection and Isolation in Complex Plants," *IEEE Control Systems Magazine*, pp. 3–11 (Dec. 1988).

Jackson, E.F. and G.S. Mudholker, "Control Procedures for Residuals Associated with Principal Component Analysis," *Technometrics 21*(3): 341–349 (Aug. 1979).

Miller, P. et al., "Contribution Plots: A Missing Link in Multivariate Quality Control," (Apr. 4, 1994).

\* cited by examiner

SENSOR VALIDATION APPARATUS AND METHOD

RELATED APPLICATION

This application is a Continuation-in-Part of U.S. patent application Ser. No. 09/179,343 filed Oct. 27, 1998 which claims the benefit of U.S. Provisional Application No. 60/096,872 filed Aug. 17, 1998, the contents of which are incorporated herein by reference in their entirety.

I FIELD OF THE INVENTION

The present invention pertains, in general, to process controllers and process monitoring systems that make use of sensors for measuring process variables. In particular it relates to a system that detects and identifies one or more sensor faults, classifies the types of sensor fault, and replaces erroneous sensor values with estimates of the correct process variable values.

II BACKGROUND OF THE INVENTION

Sensor validation is an important step for many model based applications in the process industries. Typical model based applications include model predictive control applications (MPC), and inferential sensing applications in which costly or infrequent measurements, available from laboratory samples or hardware analyzers, are replaced by regularly available inferred values from the model.

In a typical MPC application, steady state optimization is performed to find the optimal target values for the controlled and manipulated variables. If the sensors are faulty, the optimized target values are not valid. Therefore, an effective sensor validation approach that detects and identifies faulty sensors on-line is required. Once a faulty sensor is identified, it is desirable to estimate the fault magnitude and replace it with the best reconstruction in order to maintain the control system on-line even though a sensor has failed.

A typical inferential sensor application is in the area of predictive emissions monitoring systems (PEMS). Federal and/or state regulations may require air-polluting plants to monitor their emissions such as nitrogen oxides ($NO_x$), oxygen ($O_2$), and carbon monoxide (CO). Hardware continuous emissions monitoring systems (CEMS) have both a high initial cost and a high maintenance cost. CEMS can be replaced by PEMS provided the PEMS is shown to be sufficiently accurate and reliable. One of the quality assurance requirements for PEMS is that each sensor that is used in the PEMS model be monitored for failure, and have a strategy for dealing with sensor failure so as to minimize down-time.

The term sensor validation refers, for this patent application, to multivariate model based sensor validation. This is an approach which makes use of redundancy in the plant measurements. Typically sensor measurements exhibit a correlation structure which can be established by a training procedure using collected or historian data. This correlation structure can be monitored online; when the correlation structure is broken a possible sensor fault has occured. However the breaking of this correlation structure could also be due to process upset, process transition, or some other reason unrelated to sensor fault. The main objective is to determine if this really is a sensor fault and, if so, to identify the offending sensor. The various phases of sensor validation can be summarized as:

Detection This phase detects a change in the correlation structure; it may or may not be a sensor fault.

Identification This phase determines if this is a sensor fault and identifies the particular sensor Estimation This phase estimates the size of the fault which allows reconstruction of the true value and replacement of the faulty value Classification This phase classifies the type of sensor fault—complete failure, bias, drift, or precision loss Depending on the particular approach, these phases may overlap. There have been several patents granted that address the topic of multivariate model based sensor validation. The key ones are:

Qin et al. U.S. Pat. No. 5,680,409 "Method and Apparatus for detecting and identifying faulty sensors in a process"

Keeler et al. U.S. Pat. No. 5,548,528 "Virtual Continuous Emission Monitoring System"

Hopkins et al. U.S. Pat. No. 5,442,562 "Method of controlling a manufacturing process using multivariate analysis"

Qin et al. address sensor validation within the context of process control. The preferred embodiment is based on PCA (Principal Components Analysis) and performs identification through an optimal reconstruction procedure: each sensor value is reconstructed on the assumption it is at fault, then identification and classification is done by tracking indices derived from the reconstruction error.

Keeler et al. address sensor validation explicitly within the context of PEMS. The disclosed system focuses on the inferential sensor technology and the use of neural networks for PEMS. The sensor validation technology uses a suboptimal reconstruction procedure for identification, does not address classification, and makes use of an "encoder" neural network which is a non-linear version of PCA. Encoder networks are also described in Mark Kramer "Nonlinear principal component analysis using autoassociative neural networks", *AIChE Journal*, 37 (2), pp. 233–243 (1991).

Hopkins et al. address sensor validation within the context of process monitoring (multivariate statistical process control), and make use of PCA or PLS (Partial Least Squares). Identification is by means of contribution analysis. Detection is achieved by monitoring principal component "scores" or score statistics and comparing with standard confidence intervals. Identification is by examining the contributions of each original measurement to the offending score. The method does not attempt to classify fault types.

III SUMMARY OF THE INVENTION

The present invention provides a new apparatus and method for the detection, identification, estimation, reconstruction, and classification of faulty sensors. The approach makes use of steady-state or dynamic process models that can be built from first principles, MPC model identification techniques or from data using statistical methods such as partial least squares (PLS) or principal component analysis. Appendix I describes how to incorporate dynamic MPC models into this invention. One major advantage of this invention is its flexibility to use any of the aforementioned modeling techniques to develop the sensor validation model. In the preferred embodiment, the process model is based on a PCA model in which the number of principal components is chosen to optimize the reconstruction of faulty sensor values as described in Qin and Dunia "Determining the number of principal components for best reconstruction", *Proc. of the 5-th IFAC Symposium on Dynamics and Control of Process Systems*, 359–364, Corfu, Greece, Jun. 8–10, 1998.

The detection phase uses a detection index based on the model equation error. An exponentially weighted moving average (EWMA) filter is applied to the detection index to reduce false alarms due to temporary transients. The filtered detection index (FDI) is compared to a statistically derived threshold in order to detect possible faults. Detection of a possible fault condition triggers the identification phase of the invention.

The key component of this invention is the identification phase. To determine whether a detection alarm is due to one or more faulty sensors, and to identify the offending sensor (s), a series of detectors are constructed which are insensitive to one subset of faults but most sensitive to the others. These detectors are based on structured residuals (SRs) constructed by means of a novel approach referred to a structured residual approach with maximized sensitivity (SRAMS). Structured residuals are generally described in Gertler and Singer, "A new structural framework for parity equation based failure detection and isolation", *Automatica* 26:381–388, 1990. An exponentially weighted moving average (EWMA) filter is applied to the SRs to reduce false alarms due to temporary transients. The SRs are also squared and normalized so as to equitably compare different SRs. Identification is achieved by comparing these normalized squared filtered structured residuals (NSFSRs) to statistically inferred confidence limits. In addition to NSFSRs, indices based on the accumulation of the normalized structured residuals (NSRs) from the time of detection are monitored and compared for use in the identification of faulty sensors. Two such indices are the generalized likelihood ratio (GLR) index, and the normalized cumulative variance (NCUMVAR) index. The NCUMVAR index is primarily useful for identifying sensors with precision degradation.

The fault magnitude is then optimally estimated based on the model, faulty data, and the assumption that the faulty sensors have been correctly identified. This uses public domain prior art described, for example, Martens and Naes "Multivariate Calibration", John Wiley and Sons, New York, 1989. Knowledge of the fault direction (known from the identification of the faulty sensors) and the estimated fault magnitude is then used to reconstruct estimates of the correct sensor values.

The fault classification phase provides diagnostic information as to the type of sensor fault. Specifically, four types of fault are considered: Complete Failure, Bias, Drift, and Precision Loss. Complete failure is determined by performing a regression analysis on an identified faulty sensor's measured values, and is indicated by the statistical inference that the regression line has zero slope. The other three types of fault are classified by performing a regression analysis on the estimated fault sizes since the time of identification. Bias is indicated by the statistical inference that the estimated fault size regression line has zero slope and non-zero offset, and has small residual error. Drift is indicated by the statistical inference that the estimated fault size regression line has non-zero slope, and has small residual error. Precision Loss is indicated by the statistical inference that estimated fault size regression line has zero slope, zero offset, and significant residual error. Precision Loss is also indicated if the fault is identifiable only by the NCUMVAR index.

IV BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

V DETAILED DESCRIPTION OF THE PREFERRED EMBODIMENTS

Figure 1A:
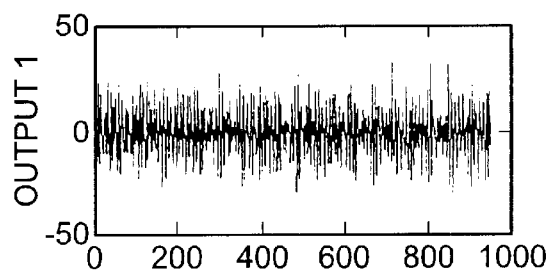
FIG. 1 shows process data for a simulated 4×4 process according to an embodiment of the present invention.
Figure 1B:
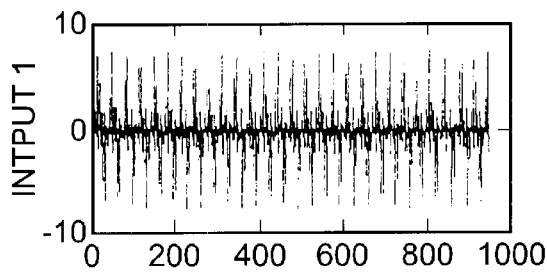
Figure 1C:
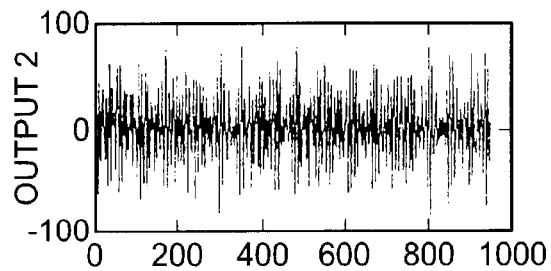
Figure 1D:
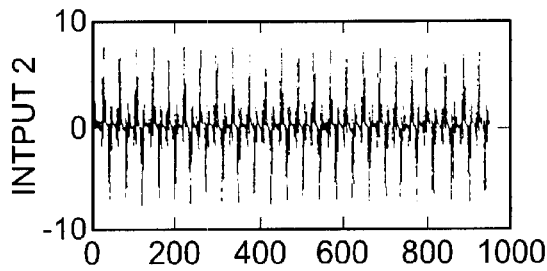
Figure 1E:
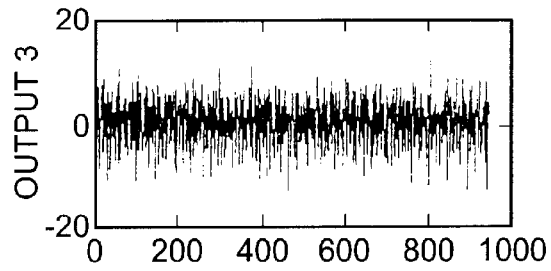
Figure 1F:
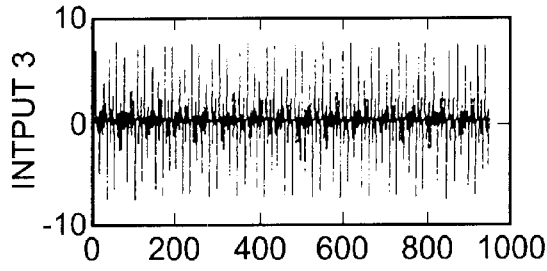
Figure 1G:
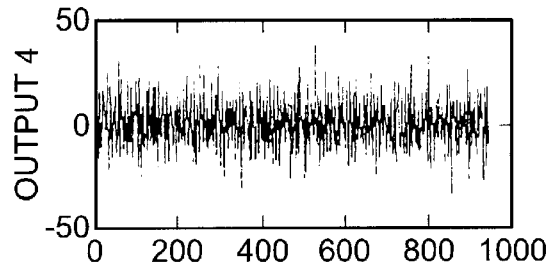
Figure 1H:
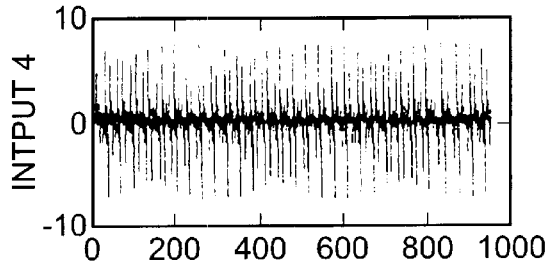
Figure 2A:
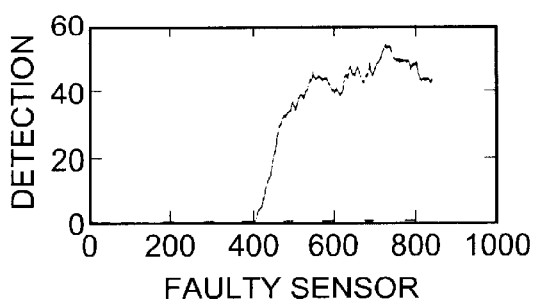
FIG. 2 shows fault detection, identification, and reconstruction results for a bias in output sensor 3 of a simulated 4×4 process according to an embodiment of the present invention.
Figure 2B:
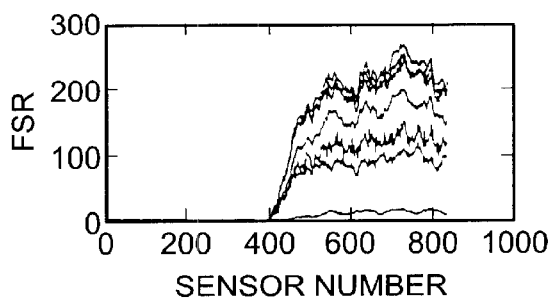
Figure 2C:
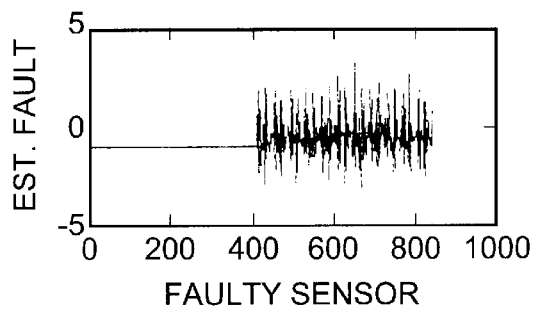
Figure 2D:
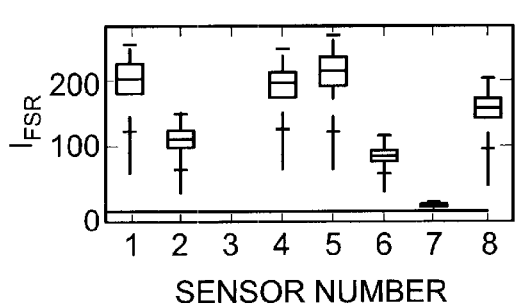
Figure 2E:
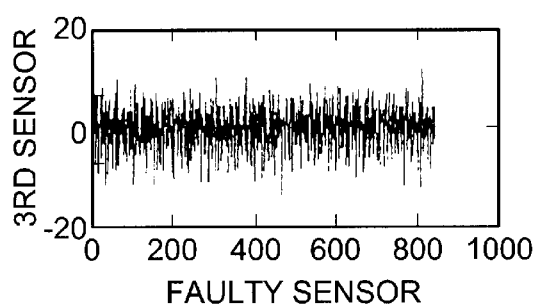
Figure 2F:
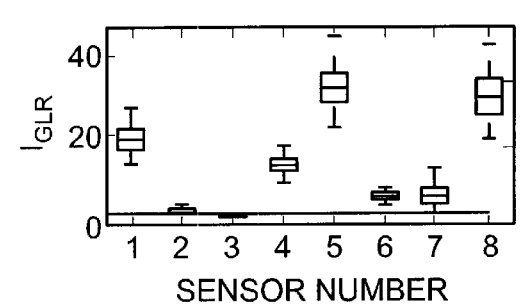
Figure 2G:
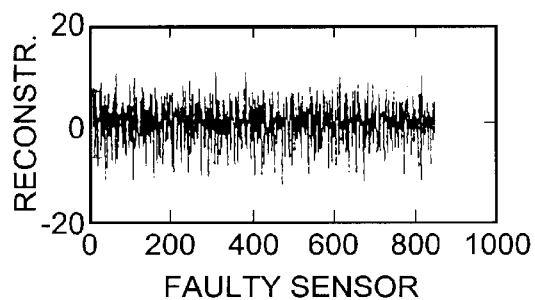
Figure 2H:
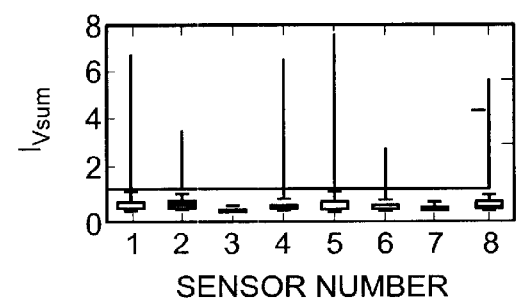
Figure 3A:
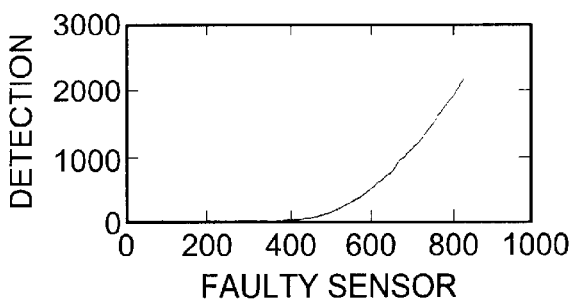
FIG. 3 shows fault detection, identification, and reconstruction results for a drift in output sensor 2 of a simulated 4×4 process according to an embodiment of the present invention.
Figure 3B:
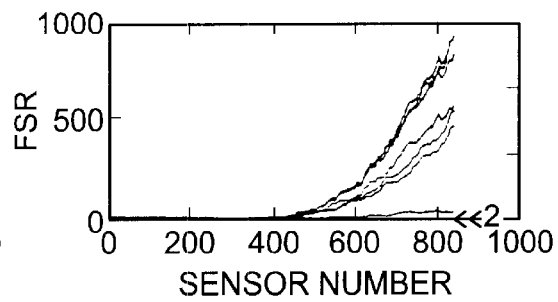
Figure 3C:
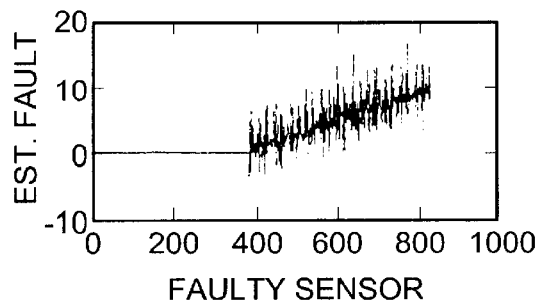
Figure 3D:
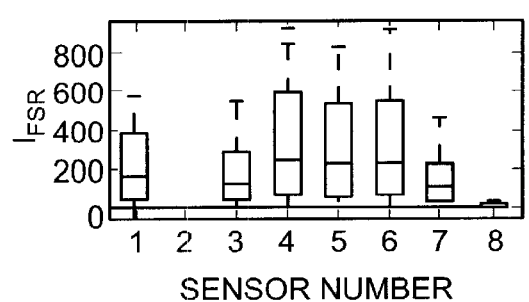
Figure 3E:
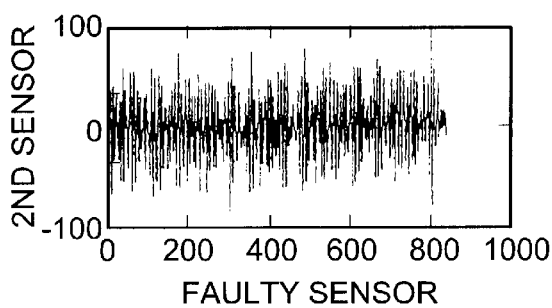
Figure 3F:
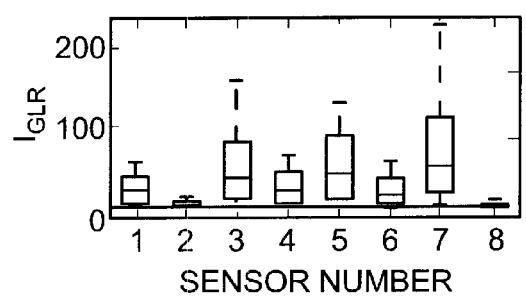
Figure 3G:
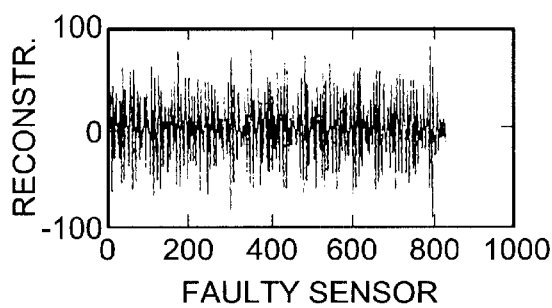
Figure 3H:
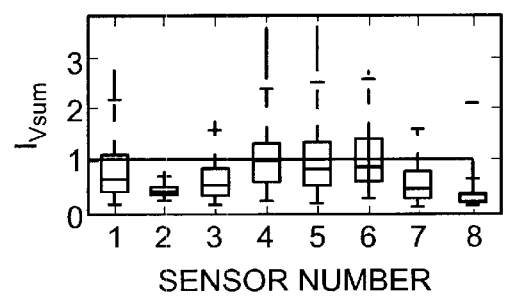
Figure 4A:
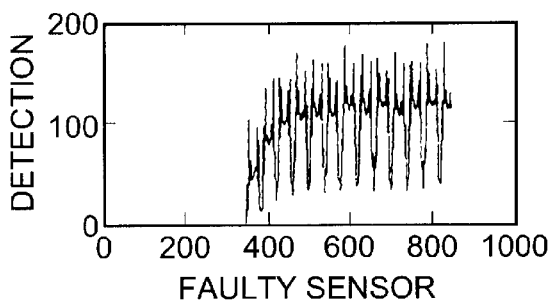
FIG. 4 shows fault detection, identification, and reconstruction results for a complete failure in input sensor 2 of a simulated 4×4 process according to an embodiment of the present invention.
Figure 4B:
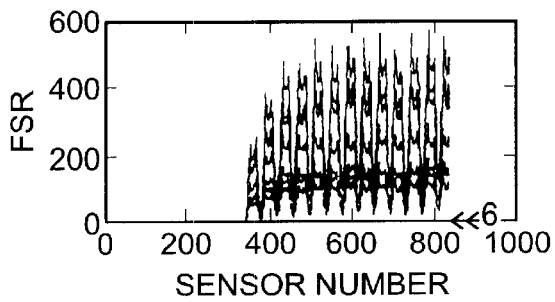
Figure 4C:
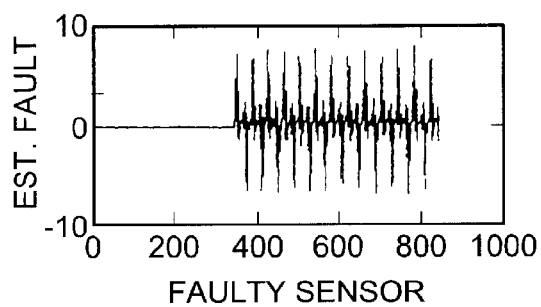
Figure 4D:
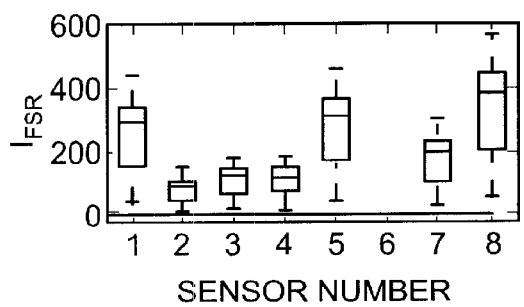
Figure 4E:
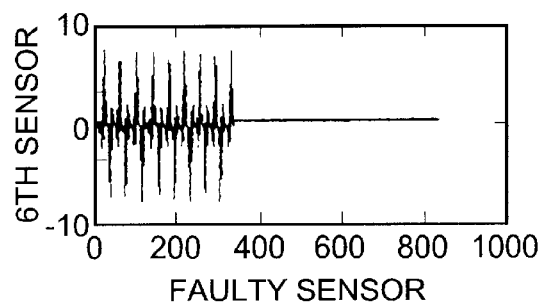
Figure 4F:
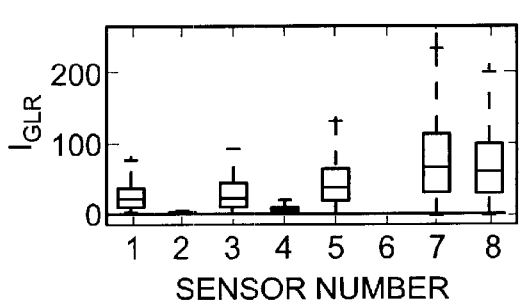
Figure 4G:
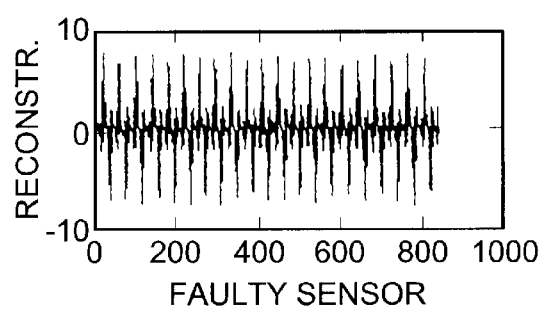
Figure 4H:
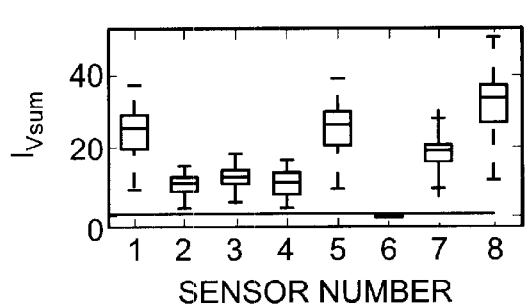
Figure 5A:
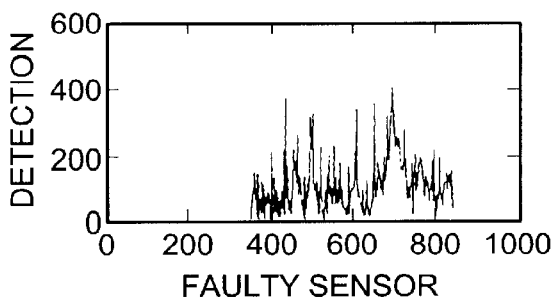
FIG. 5 shows fault detection, identification, and reconstruction results for a precision degradation in input sensor 4 of a simulated 4×4 process according to an embodiment of the present invention.
Figure 5B:
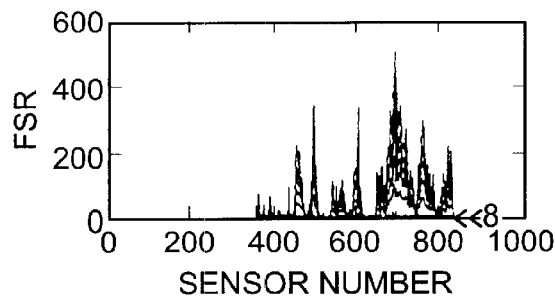
Figure 5C:
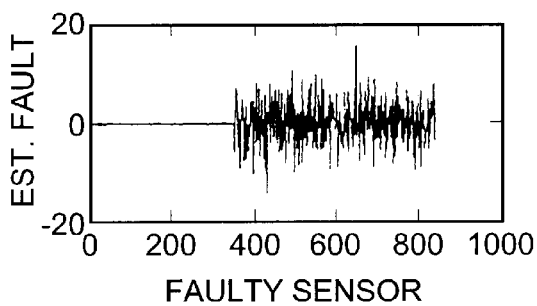
Figure 5D:
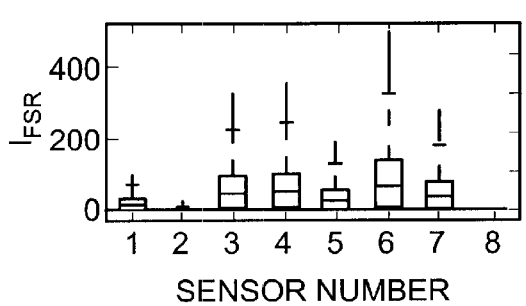
Figure 5E:
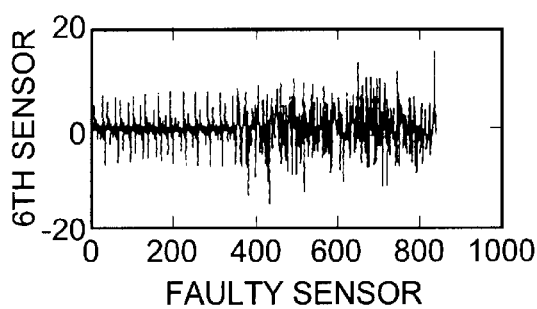
Figure 5F:
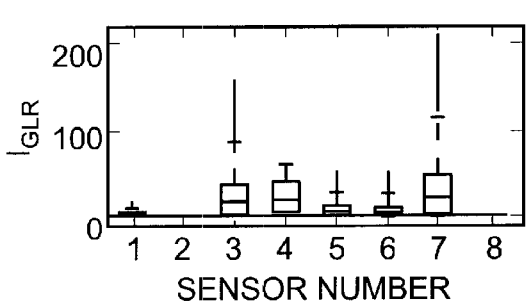
Figure 5G:
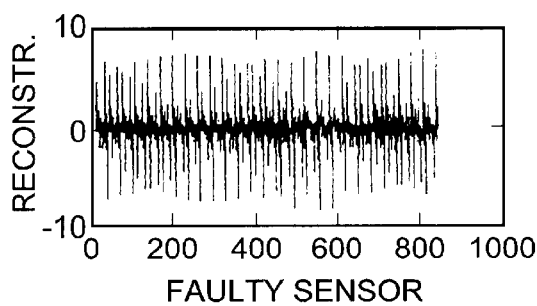
Figure 5H:
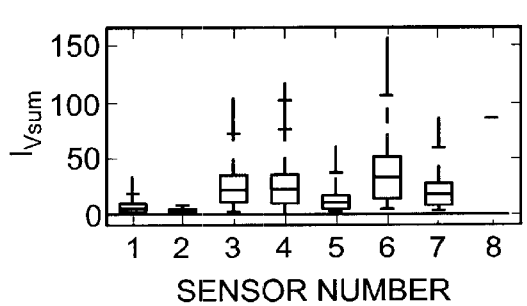
Figure 6A:
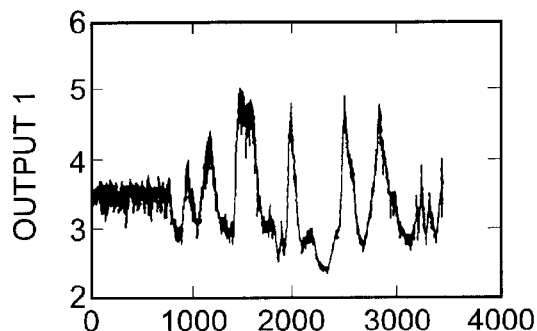
FIG. 6 shows process data for an industrial 3×3 process according to an embodiment of the present invention.
Figure 6B:
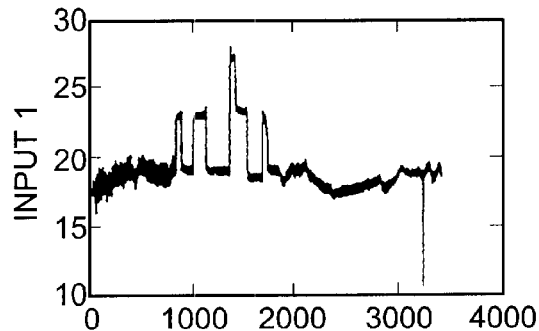
Figure 6C:
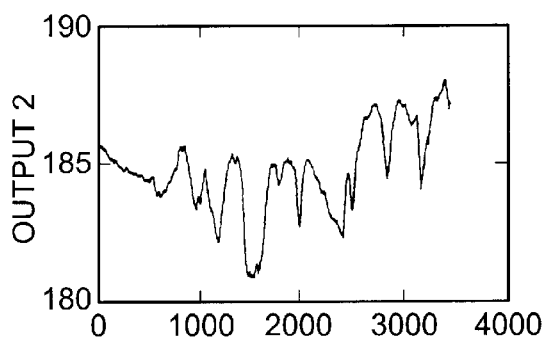
Figure 6D:
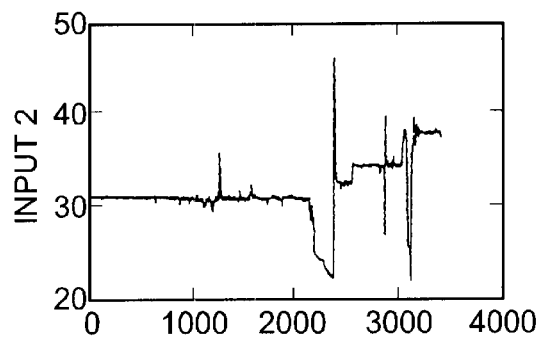
Figure 6E:
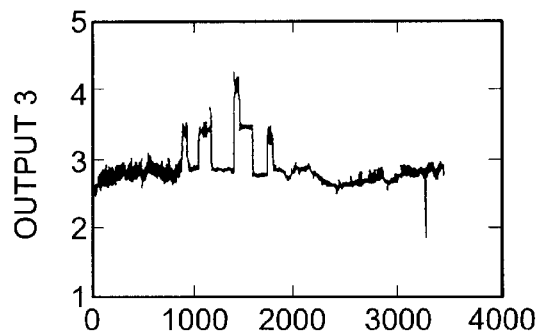
Figure 6F:
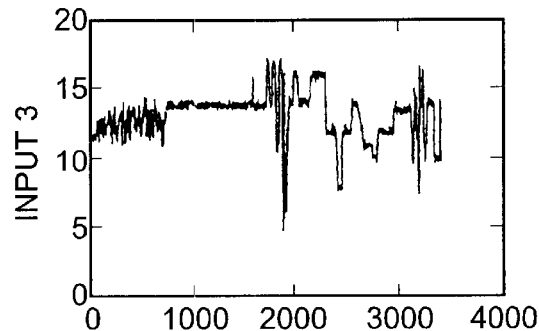
Figure 7A:
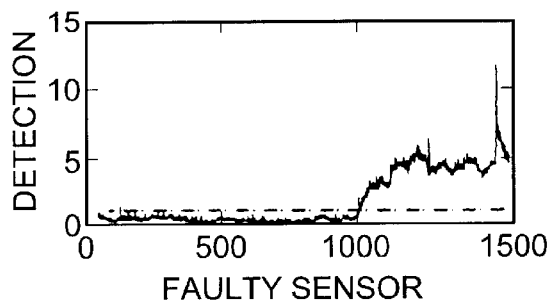
FIG. 7 shows fault detection, identification, and reconstruction results for a bias in output sensor 3 of an industrial reactor according to an embodiment of the present invention.
Figure 7B:
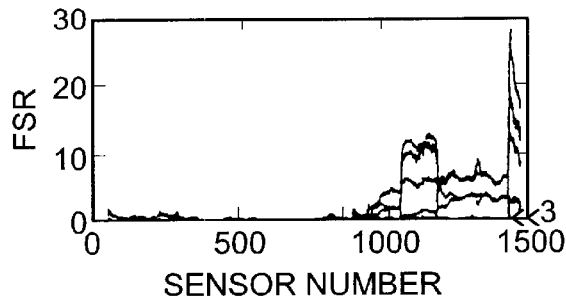
Figure 7C:
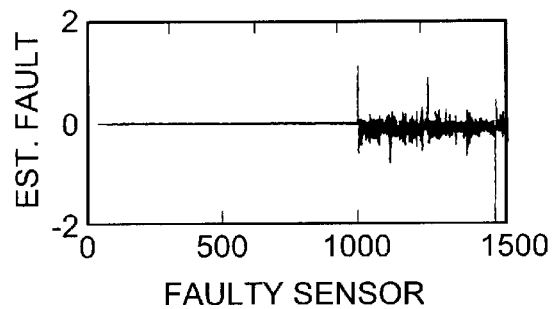
Figure 7D:
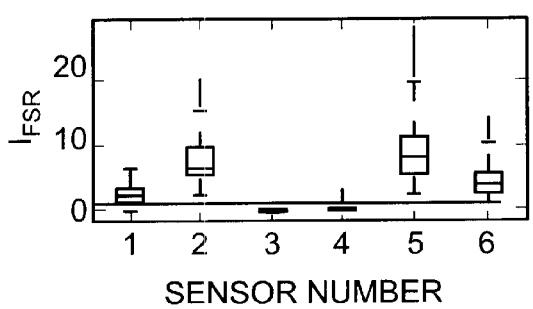
Figure 7E:
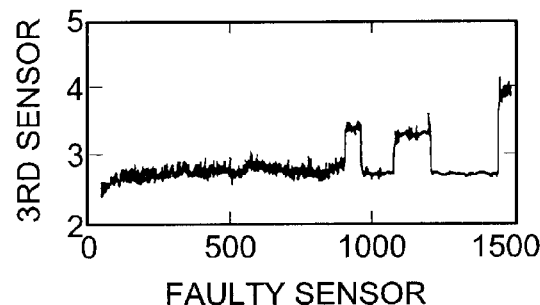
Figure 7F:
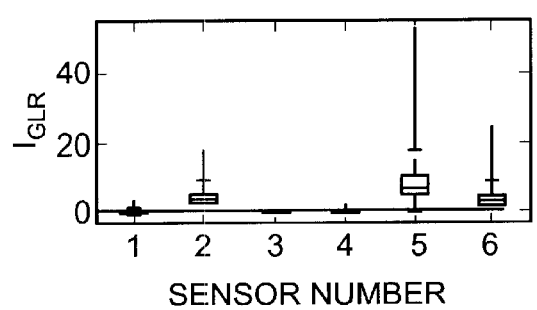
Figure 7G:
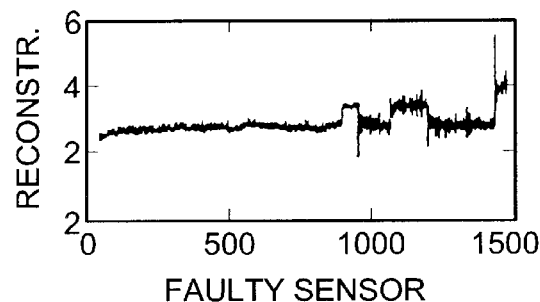
Figure 7H:
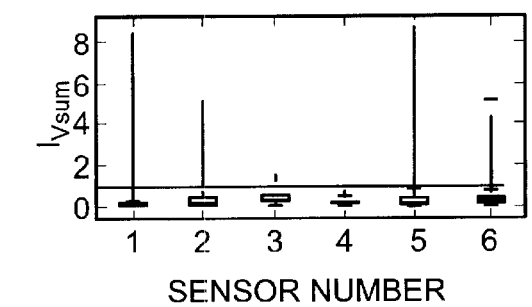
Figure 8A:
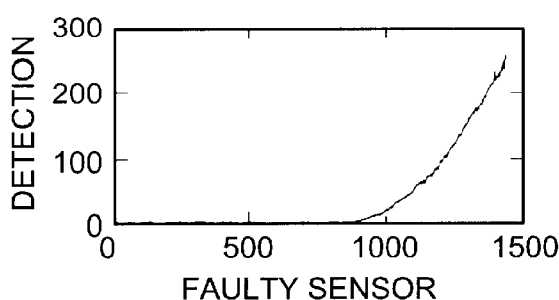
FIG. 8 shows fault detection, identification, and reconstruction results for a drift in output sensor 2 of an industrial reactor according to an embodiment of the present invention.
Figure 8B:
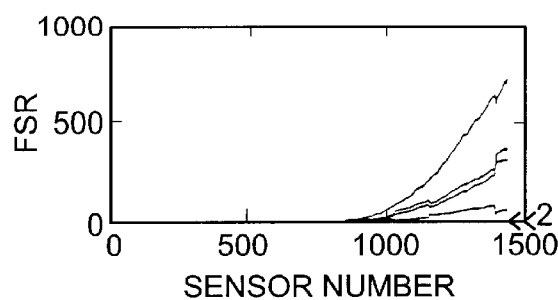
Figure 8C:
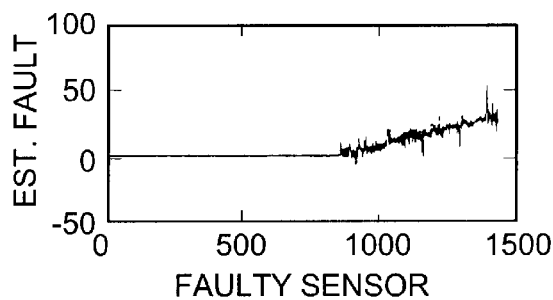
Figure 8D:
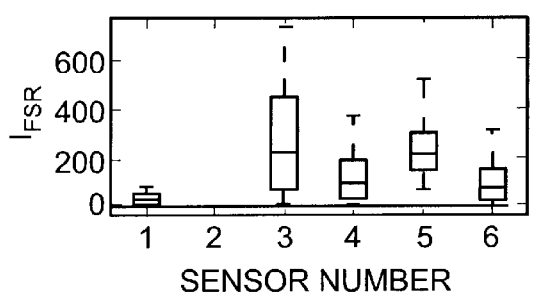
Figure 8E:
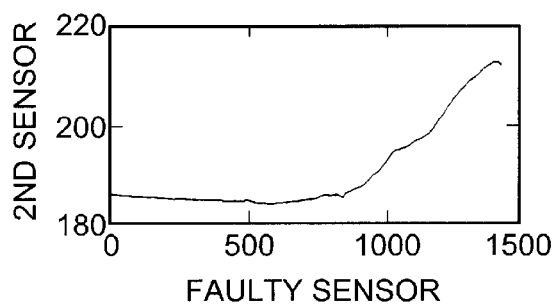
Figure 8F:
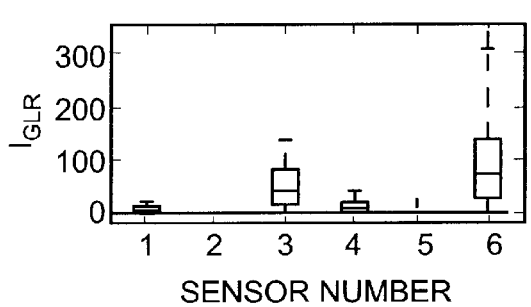
Figure 8G:
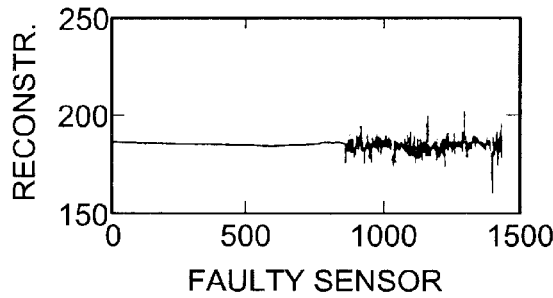
Figure 8H:
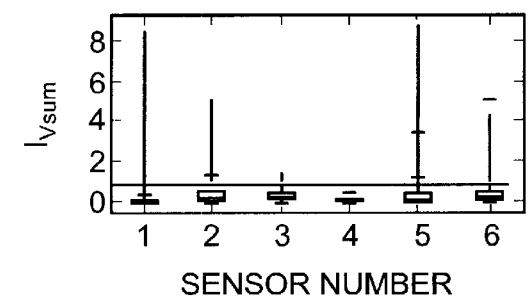
Figure 9A:
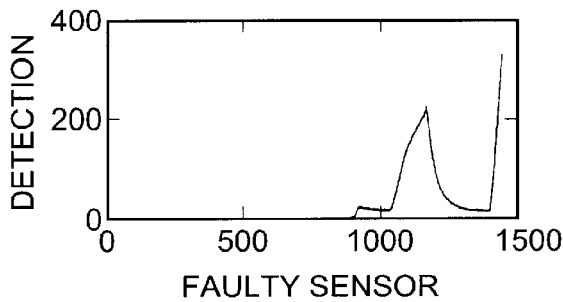
FIG. 9 shows fault detection, identification, and reconstruction results for a complete failure in input sensor 1 of an industrial reactor according to an embodiment of the present invention.
Figure 9B:
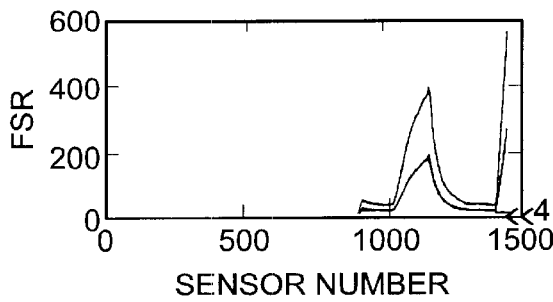
Figure 9C:
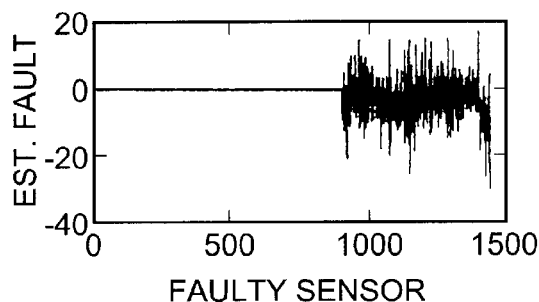
Figure 9D:
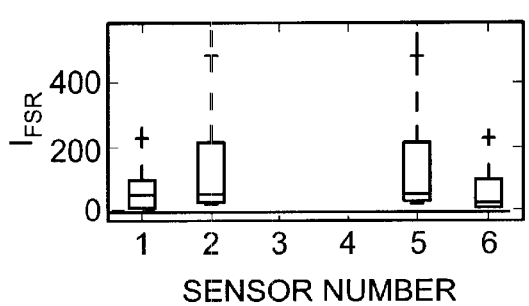
Figure 9E:
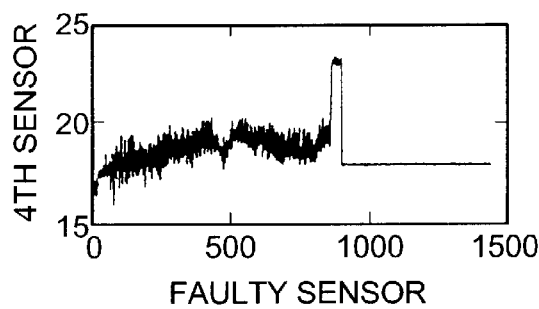
Figure 9F:
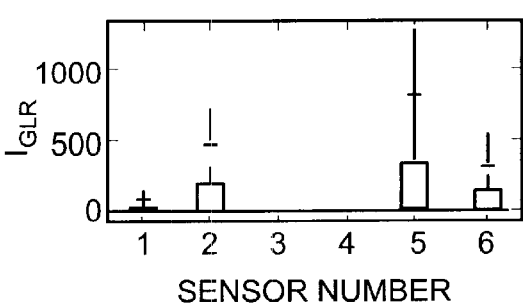
Figure 9G:
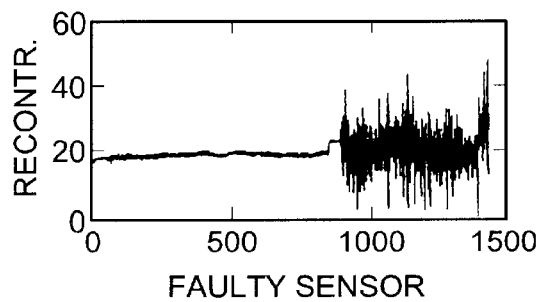
Figure 9H:
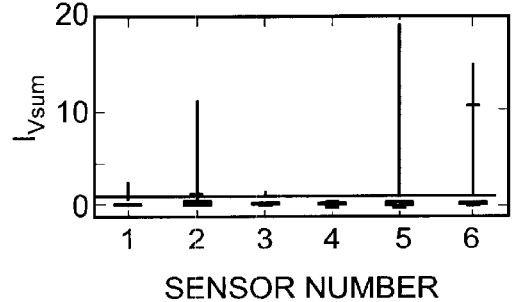
Figure 10A:
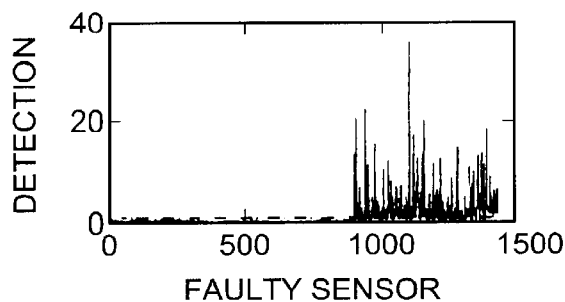
FIG. 10 shows fault detection, identification, and reconstruction results for a precision degradation in input sensor 3 of an industrial reactor according to an embodiment of the present invention.
Figure 10B:
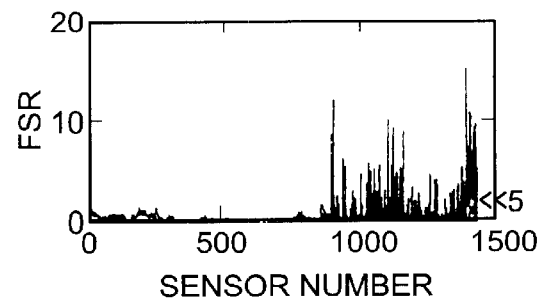
Figure 10C:
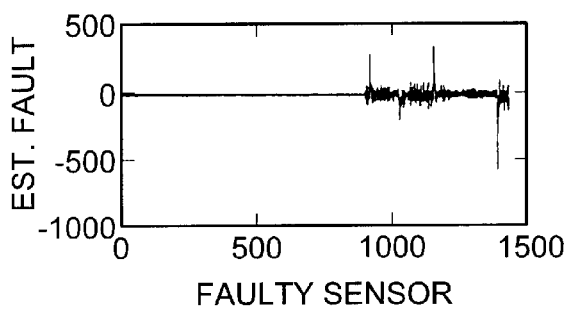
Figure 10D:
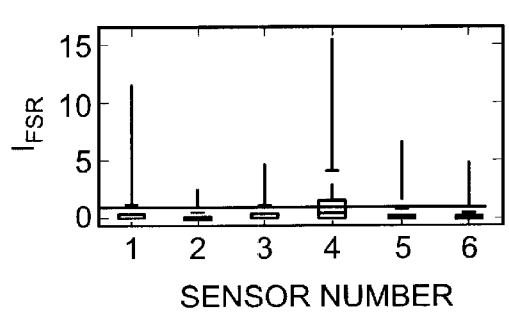
Figure 10E:
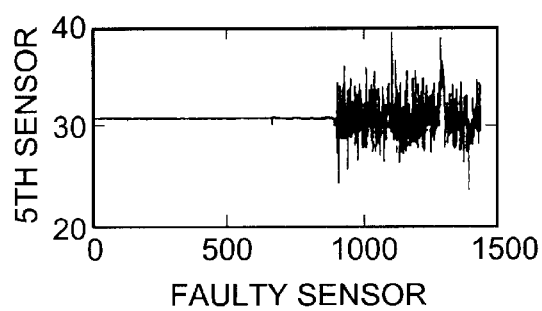
Figure 10F:
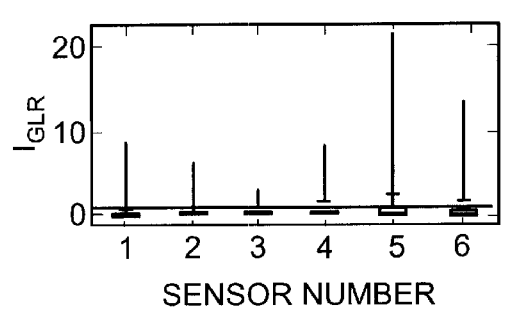
Figure 10G:
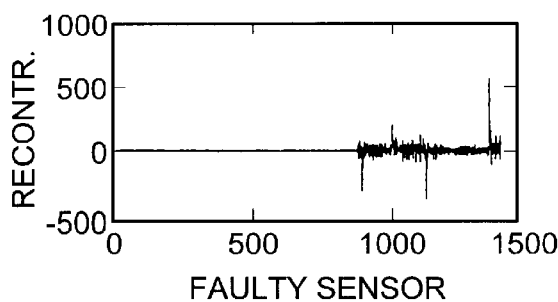
Figure 10H:
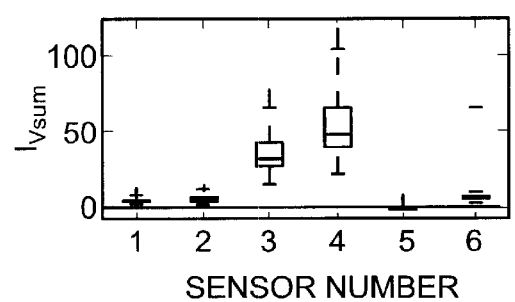
Figure 11:
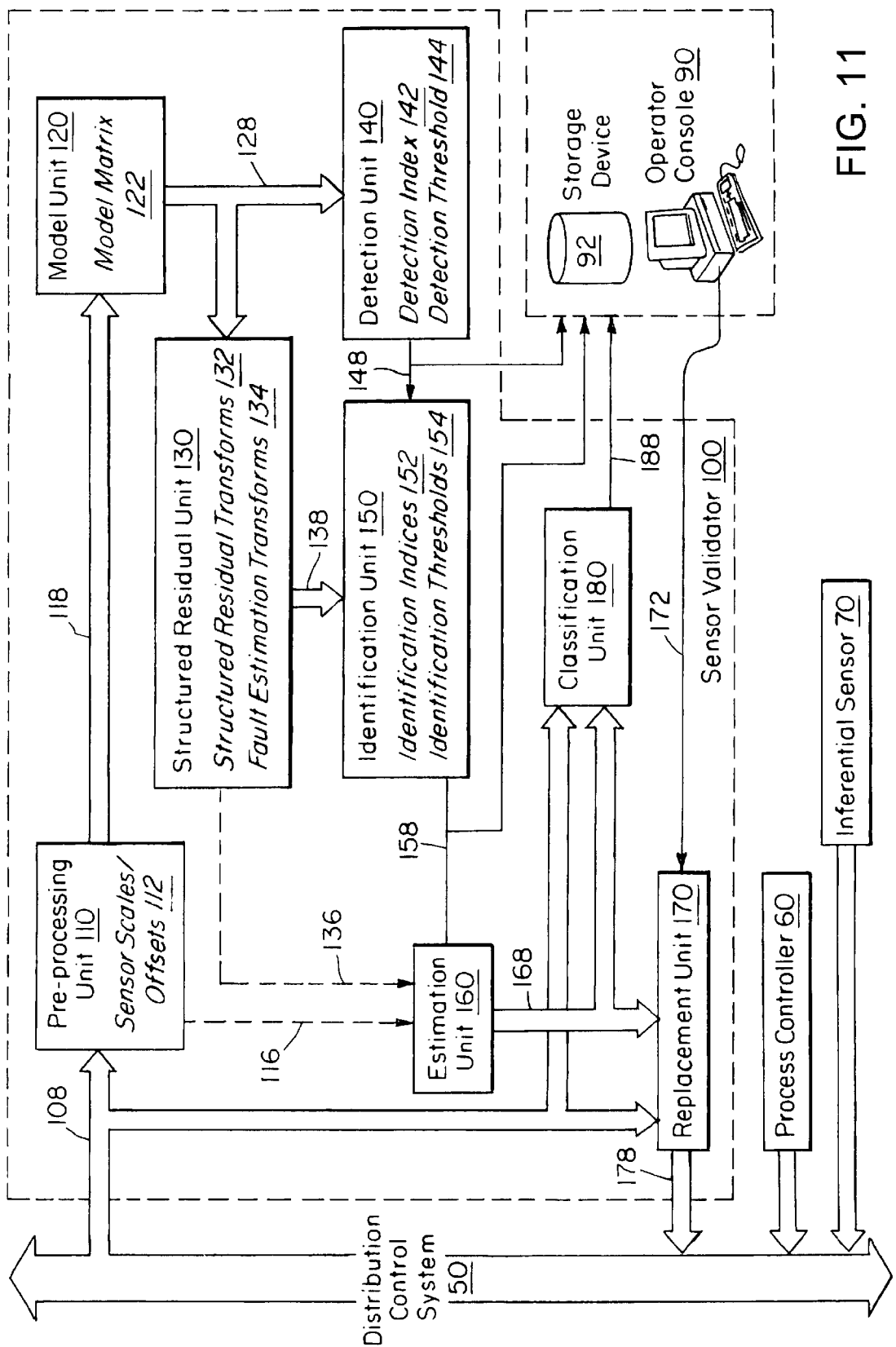
FIG. 11 shows the eight computational units of the preferred embodiment of the invention and the relationships between these units.

The sensor validation apparatus 100 of this invention is shown in FIG. 11. The external input to the sensor validator consists of sensor measurements 108, which may include status information, as might be available, for example, from a Distributed Control System (DCS) 50 in a manufacturing plant. The purpose of the invention is to use redundant information in the sensor measurements to detect when a sensor has failed, and, optionally, to provide a replacement value for a failed sensor. Other devices such as a process controller 60 or inferential sensor 70 that make use of the sensor measurements can then use the replacement values if necessary. This allows these devices to continue operation in the presence of failed sensors.

Referring again to FIG. 11, the sensor validator 100 consists of eight computational units that implement the various phases of sensor validation. These computational units, which may be implemented using a microprocessor or any other desired type of computer, are as follows:

A Pre-processing Unit 110, which maintains scaling and offset information 112 to convert the vector of sensor values 108 from the DCS 50 to a vector of normalized values 118. These normalized values have standardized units for which, in the preferred embodiment, the values are designed to have a mean of 0 and a standard deviation of 1. This is necessary for building an effective model matrix 122, detection index 142, and structured residual transforms 132 for identifying faulty sensors. The scaling and offset information is, in the preferred embodiment, derived from a statistical analysis of a historical set of sensor data.

A Model Unit 120, which maintains a model matrix 122 to convert the vector of preprocessed sensor values 118 at a given instance to an error vector referred to as the equation error 128. The equation error is used by the Structured Residual Unit 130 to calculate structured residuals values 138 and fault sizes 136, and by the Detection Unit 140 to calculate the detection index 142. The Structured Residual Unit also uses the model matrix to design structured residual transforms 132 and their corresponding fault estimation transforms 134. The model matrix is, in the preferred embodiment, built from a historical set of sensor data using Principal Component Analysis.

A Structured Residual Unit 130, which maintains a working set of structured residual transforms 132 that convert the current equation error 128 to a set of structured residual values 138. The Identification Unit 150 uses these structured residual values to determine the identity of any faulty sensors. The Structured Residual Unit also maintains a set of fault estimation transforms 134 that are used by the Estimation Unit 160 to obtain normalized fault sizes 136 for identified faults.

A Detection Unit 140, which calculates a detection index 142 from the equation error 128, and compares the detection index to detection threshold 144. If the detection index exceeds the detection threshold, then a detection event 148 is generated. This detection event is used to activate the Identification Unit 150, and is also available externally to the sensor validator, for example for operator alarm generation or event logging to an operator console 90, or to a storage device 92.

An Identification Unit 150, which uses the structured residual values 138 to calculate several sets of identification indices 152. If a detection event 148 has occurred, then the Identification Unit attempts to identify the nature of the fault by comparing the identification indices to a corresponding set of thresholds 154, according to a certain logic, described in detail later. If identification is successful, an identification event 158 is generated which is used to activate the Estimation Unit. This identification event includes information as to which sensors failed, and is also available externally to the sensor validator, for example for operator alarm generation or event logging to an operator console 90, or to a storage device 92.

An Estimation Unit 160, which is activated by an identification event 158. The Estimation Unit requests the Structured Residual Unit 130 to apply the appropriate fault estimation transform 134 (chosen based on identification information) to the equation error 128, resulting in normalized fault size information 136. The Estimation Unit then applies the appropriate scaling 116 to 136, in order to produce fault size estimates 168 scaled to the units of the original sensor values.

A Replacement Unit 170, which subtracts the estimated fault sizes 168 from the corresponding faulty sensor measurements 108, to obtain a set of replacement values 178. These replacement values are available externally to the sensor validator; for example they are written to the DCS 50 for use by other devices. The Replacement Unit is only active when the Estimation Unit 160 is active. It can also be deactivated by request of an operator 172; in this case the output 178 of the Replacement Unit is identical to the original input 108 to the sensor validator.

A Classification Unit 180, which calculates diagnostic information as to the type of sensor fault. Specifically, four types of fault are considered: Complete Failure, Bias, Drift, and Precision Loss. The Classification Unit is only active when the Estimation Unit 160 is active, which, in turn, is only active when an identification event 158 has been generated. The classification is based on an analysis of the sensor data 108 and the fault size estimations 168 since the time of identification. The classification information 188 produced by the Classification Unit is available externally to the sensor validator, for example for operator alarm generation or event logging to an operator console 90, or to a storage device 92.

A detailed description of the preferred embodiment of each of these computational units now follows.

V.1 Pre-processing Unit

The Pre-processing Unit 110 calculates and maintains scaling and offset information to convert between measured sensor values 108 from the DCS and normalized values 118 for inputting to the Model Unit and the Structured Residual Unit. The scale value $s_i$ and offset value $o_i$ for the $i^{th}$ sensor are, in the preferred embodiment of this invention, calculated from the mean $\mu_i$ and standard deviation $\sigma_i$ of the $i^{th}$ sensor as follows:

$$s_i = \frac{1}{\sigma_i} \quad (1)$$

$$o_i = \mu_i$$

Then a measured value $u_i$ of the $i^{th}$ sensor is converted to a normalized value $x_i$ by:

$$u_i = s_i(x_i - o_i) \quad (2)$$

$\mu_i$ and $\sigma_i$ are estimated from representative sample data in the standard way well known to those skilled in the art.

V.2 Model Unit

The Model Unit 120 maintains a normal process model, which can be represented by the following equation:

$$Bx^*(t) = e^*(t) \tag{3}$$

where $x^* \in R^n$ is a vector of preprocessed sensor values, $B \in R^{m \times n}$ is the model matrix 122, and $e^* \in R^m$ is the equation error 128. The matrix B can be derived from steady state of dynamic first principles methods, process data using statistical methods such as Principal Component Analysis (PCA), Partial Least Squares (PLS) or from dynamic Multivariable Predictive (MPC) models as detailed in Appendix I.

V.2.1 Model Unit Based on PCA

In the preferred embodiment, the normal process model is derived from process data using PCA. PCA is generally described in, for example, J. Edward Jackson "A User's Guide to Principal Components" John Wiley 1991. In PCA the sensor values $x^*(t) \in R^n$ are decomposed into:

$$x^*(t) = PP^T x^*(t) + \tilde{P}\tilde{P}^T x^*(t) \tag{4}$$

where $P \in R^{n \times (n-m)}$ are the eigenvectors associated with the principal eigenvalues $\lambda_1 \geq \lambda_2 \geq \ldots \lambda_{n-m}$ of the correlation matrix of $x^*(t)$. In this case, the model equation error $e^*(t)$ corresponds to the residual components $(\lambda_{n-m+1}, \ldots \lambda_n)$, and, as described in Gertler, Li, Huang and McAvoy "Isolation enhanced principal component analysis" *Proc. IFAC Workshop on On-line Fault Detection and Supervision in the Chemical Process Industries*, Jun. 4–5, 1998, $$B = \tilde{P}^T \tag{5}$$

In the preferred embodiment, the optimal number of principal components is chosen for optimal reconstruction capability as described in detail in Qin and Dunia "Determining the number of principal components for best reconstruction", *Proc. of the 5-th IFAC Symposium on Dynamics and Control of Process Systems*, 359–364, Corfu, Greece, Jun. 8–10, 1998.

V.2.2 Model Unit Based on State Space MPS Formulation

In an alternative embodiment, the process model is derived from an existing Multivariable Predictive Control (MPC) model. The model and fault representation are formulated as subspace models as described in Appendix I. This approach allows the model unit to be constructed from many types of dynamic models including state space, ARX and FIR models.

V.3 Structured Residual Unit

The Structured Residual Unit 130 maintains transforms that are sensitive or insensitive to faults in certain directions. These transforms are described in the context of the following fault representation.

V.3.1 Fault Representation

Under normal conditions, the equation error $e^*(t)$ 128 contains mainly measurement noise, which can be assumed to be zero mean Gaussian noise. When a sensor fault occurs, the sensor measurement will contain the normal values of the process variables and the fault, i.e., $$x(t) = x^*(t) + \Xi_i f_i(t) \tag{6}$$

where $f_i(t) \in R^{l_i}$ is a vector of the fault magnitude, and $\Xi_i \in R^{n \times l_i}$ is a matrix of fault directions. To represent a single sensor fault in the $i^{th}$ sensor $$\Xi_i = [0 \ 0 \ \ldots \ 1 \ \ldots \ 0]^T \tag{7}$$

which is the $i^{th}$ column of the identity matrix. To represent simultaneous multiple sensor faults, $\Xi_i$ simply contains the corresponding columns of the identity matrix. Using the measurement relation of equation 6 that contains a sensor fault, the equation error 128 can be written as follows:

$$e(t) = Bx(t) = Bx^*(t) + B\Xi_i f_i(t) = e^*(t) + B\Xi_i f_i(t) \tag{8}$$

The fault will in general cause the equation error e(t) to increase. The magnitude of the equation error is used to detect sensor faults as described later. Since a distinct vector or matrix $\Xi_i$ represents each sensor fault, fault identification can be accomplished by using the direction vectors.

For the dynamic sensor validation case where the model unit is developed from dynamic MPC models, the fault representation is reformulated in a subspace form as described in Appendix I.

V.3.2 Structured Residual Transformations for Single Faults

The Structured Residual Unit 130 maintains a set of transforms referred to as structured residuals. The Identification Unit 150, described in a later section, uses the structured residual transforms to identify faulty sensors.

Structured residuals are generally described in Gertler and Singer, "A new structural framework for parity equation based failure detection and isolation", *Automatica* 26:381–388, 1990. In the present invention, a new design method for structured residuals is disclosed, referred to as "Structured Residual Approach with Maximized Sensitivity" or SRAMS.

For the case of single sensor fault in the $j^{th}$ sensor, $$B\Xi_j = b_j \tag{9}$$

where $b_j$ is the $j^{th}$ column of matrix B. Therefore, the model equation error is $$e(t) = e^*(t) + b_j f_j(t) \tag{10}$$

With a selected residual structure, a set of structured residuals r(t) can be generated by pre-multiplying the equation error vector e(t) by a transformation matrix W, $$r(t) = We(t) \tag{11}$$

It is desirable to design each element of r(t) to be responsible for one particular sensor fault but not responsible for other faults. The $i^{th}$ element of r(t) given that the $j^{th}$ sensor is faulty is represented as $$r_{ij}(t) = w_i^T e(t) = w_i^T e^*(t) + w_i^T b_j f_j(t) \quad i,j=1,2,\ldots,n \tag{12}$$

where $w_i^T$ is the $i^{th}$ row of matrix $W \in R^{n \times m}$. Since e(t) is random noise, one can only design the residual $r_{ij}(t)$ to be sensitive or insensitive to $b_j$, the fault direction vector. The SRAMS design criterion is stated as follows:

Choose $w_i$ such that $r_{ii}(t)$ is insensitive to the $i^{th}$ sensor fault but most sensitive to the others. Mathematically, this is equivalent to $$\max_{w_i} \sum_{j \neq i} \frac{(w_i^T b_j)^2}{\|w_i\|^2 \|b_j\|^2}$$

subject to:

$$w_i^T b_i = 0$$

Geometrically, $w_i$ is chosen to be orthogonal to $b_i$, while minimizing its angle to other fault directions $b_j$, $j \neq i$. This problem can be equivalently stated as follows:

$$\max_{w_i} \sum_{j \neq 1} (w_i^T b_j^o)^2 \quad (13)$$

subject to:

$$w_i^T b_i^o = 0$$

$$\|w_i\| = 1$$

where $$b_j^o = \frac{b_j}{\|b_j\|} \quad j = 1, 2, \ldots, n \quad (14)$$

To satisfy the constraint $w_i^T b_i^o = 0$, the vector $w_i$ must be chosen as follows:

$$w_i = (I - b_i^o b_i^{o^T}) z_i \in S_{w_i}, \ z_i \in R^m \quad (15)$$

where $S_{w_i}$ is the orthogonal complement of $b_i$. Therefore, the solution of $w_i$ is converted to the solution of $z_i$. Using a Lagrange multiplier $\lambda$, the solution of $z_i$ can be found by maximizing the following objective:

$$J = \max_{z_i} \left( \sum_{j \neq i} \left( z_i^T (I - b_i^o b_i^{o^T}) b_j^o \right)^2 + \lambda \left( 1 - z_i^T (I - b_i^o b_i^{o^T}) z_i \right) \right) \quad (16)$$

$$= \max_{z_i} \left( \sum_{j=1}^{N} \left( z_i^T (I - b_i^o b_i^{o^T}) b_j^o \right)^2 + \lambda \left( 1 - z_i^T (I - b_i^o b_i^{o^T}) z_i \right) \right)$$

The above relation holds because $(I - b_i^o b_i^{o^T}) b_i^o = 0$. Denoting $$[b_1^o \ldots b_n^o] = B^o \quad (17)$$

and $$(I - b_i^o b_i^{o^T})[b_1^o \ldots b_n^o] = (I - b_i^o b_i^{o^T}) B^o = B_i^o \quad (18)$$

which is the projection of $B^o$ onto $S_{w_i}$, the maximization problem can be rearranged as follows:

$$J = \max_{z_i} (\|B_i^{o^T} z_i\|^2 + \lambda (1 - z_i^T (I - b_i^o b_i^{o^T}) z_i)) \quad (19)$$

Differentiating J with respect to $z_i$ leads to $$B_i^o B_i^{o^T} z_i = \lambda (I - b_i^o b_i^{o^T}) z_i \quad (20)$$

Note that $$B_i^o = (I - b_i^o b_i^{o^T}) B^o \quad (21)$$

$$= (I - b_i^o b_i^{o^T})^2 B^o$$

$$= (I - b_i^o b_i^{o^T}) B_i^o$$

Equation 20 can be rearranged as $$(I - b_i^o b_i^{o^T})(B_i^o B_i^{o^T} z_i - \lambda z_i) = 0$$

or $$B_i^o B_i^{o^T} z_i - \lambda z_i = 0 \quad (22)$$

Therefore $z_i$ is the eigenvector of $B_i^o B_i^{o^T}$ that corresponds to the largest eigenvalue. After $z_i$ is known, $w_i$ can be easily calculated from equation 15.

V.3.3 Structured Residual Transformations for Multiple Faults

The SRAMS design method can be extended to the case in which multiple sensors fail simultaneously. The equation error vector for multiple sensor faults is $$e(t) = e^*(t) + b_i \Xi_i f_i(t) \quad (23)$$

where $B\Xi_i \in R^{m \times q}$ contains q columns of B corresponding to the failed sensors, and $f_i(t) \in R^q$ is a vector of the fault magnitudes. Note that the columns of $B\Xi_i$ can be linearly dependent. Performing a singular value decomposition (a matrix decomposition well known to those skilled in the art) on $B\Xi_i$ and keeping only non-zero singular values yields $$e(t) = e^*(t) + U_q D_q V_q^T f_i(t) \quad (24)$$

$$= e^*(t) + U_q f_q(t)$$

where $$f_q(t) = D_q V_q^T f_i(t) \quad (25)$$

To design $w_q$ for multiple sensor faults, $w_q$ is chosen in the orthogonal complement of $U_q$, that is $$w_q = (I - U_q U_q^T) z_q \in S_{w_q} \quad (26)$$

similar to the single sensor fault case. Furthermore, the following objective is maximized:

$$\max_{z_q} \|z_q^T (I - U_q U_q^T) B^o\|^2 = \max_{z_q} \|z_q^T B_q^o\|^2 \quad (27)$$

subject to $$\|(I - U_q U_q^T) z_q\| = 1 \quad (28)$$

where $$B_q^o = (I - U_q U_q^T) B^o \quad (29)$$

After using a Lagrange multiplier, $z_q$ is found to be the solution to the following equation:

$$B_q^o B_q^{o^T} z_q = \lambda (I - U_q U_q^T) z_q \quad (30)$$

From 29 we obtain $$(I - U_q U_q^T)(B_q^o B_q^{o^T} z_q - \lambda z_q) = 0$$

or $$B_q^o B_q^{o^T} z_q = \lambda z_q \quad (31)$$

Therefore, $z_q$ is simply the eigenvector of $B_q^o B_q^{o^T}$ associated with the largest eigenvalue.

V.3.4 Comparison to Conventional Structured Residual Approach

The conventional structured residual approach (Gertler and Singer, "A new structural framework for parity equation based failure detection and isolation", *Automatica* 26:381–388, 1990, and Gertler and Singer, "Augmented models for statistical fault isolation in complex dynamic systems", *Proceedings of the American Control Conference*, pp317–322, 1985) chooses $w_i$ to be insensitive to a particular fault of interest, but it does not maximize the sensitivity to other faults. In a typical structured residual design, the selecting of $w_i$ is not unique and is somewhat arbitrary. The arbitrariness in this design leads to a sub-optimal solution that does not maximize the potential to isolate faults. The SRAMS approach of the present invention embodies a unique design of $w_i$ that maximizes the sensitivity to other faults while being insensitive to the fault of interest.

V.3.5 Transformations Maintained by the Structured Residual Unit

In the preferred embodiment of the invention, the Structured Residual Unit maintains a core set of structured residual transforms corresponding to single sensor faults as described in section V.3.2. These core structured residual transforms form the initial working set of structured residual transforms 132 and associated fault estimation transforms 134.

When one or more sensors measurements 108 from the DCS are marked as bad on input to the sensor validator, a new working set of structured residual transforms, and associated fault estimation transforms, is created by the Structured Residual Unit. These are as follows: if b sensors are marked as bad on input, then n−b+1 new structured residual transforms are designed. The first structured residual transform is designed with a $\Xi$ that selects the columns of the identity matrix corresponding to the b bad sensors; this structured residual transform is insensitive to these bad sensor values but is sensitive to faults in any of the other sensors. The remaining n−b structured residual transforms are designed with a $\Xi$ which selects the columns of the identity matrix correspond to the b bad sensors plus one more column corresponding to each other sensor in turn. This allows the identification of a further faulty sensor in addition to those marked as bad on input.

Other structured residual transforms can optionally be designed and added to the working set. For example, a set of transforms based on a $\Xi$ that selects all pairs of columns from the identity matrix. This allows identification of pairs of simultaneous faults. However, a preferred method of detecting multiple faults is to use several sensor validators. For example, in FIG. 11, if a process controller 60 uses 5 sensor values as inputs, up to 5 sensor validators 100 can be utilized, one for each input of the controller. Each sensor validator uses one of the inputs together with other redundant sensor measurements that are not input to the process controller.

Another scenario is to have several sensor validators, each optimized for detection and identification of faults in particular sensors, feeding another sensor validator that is optimized for reconstruction.

V.4 Detection Unit

The Detection Unit 140 monitors the correlation structure of the pre-processed sensor values by calculating a detection index 142 based on the current equation error. If this detection index exceeds a threshold 144 based on a statistically inferred confidence limit, a detection event 148 is generated, and the Identification Unit is activated. In the preferred embodiment a filtered normalized fault detection index (NFFDI) is used as described below.

V.4.1 Fault Detection Index

The fault detection index (FDI) is defined as follows $$\text{FDI} = \|e(t)\|^2 = \|e^*(t) + B\Xi f_s(t)\|^2 \tag{7}$$

When no fault is present, $\text{FDI} = \|e^*(t)\|^2 = \|Bx^*(t)\|^2$. Therefore, the detection alarm threshold for FDI is actually the confidence limit for $\|e^*(t)\|^2$.

V.4.2 Normalized Fault Detection Index

In practical industrial processes, the process variables $x^*(t)$ typically are not normally distributed. However, the equation error $e^*(t)$ 128 contains mainly measurement noise and therefore can be considered zero mean Gaussian noise. As a consequence $e^*(t)^T R_e^{-1} e^*(t)$ satisfies a $\chi^2$ distribution with m degrees of freedom, where $R_e = E\{e(t)e^T(t)\}$ is the equation error covariance matrix. Thus defining the normalized fault detection index as $$\text{NFDI} = e(t)^T R_e^{-1} e(t)$$

the detection alarm threshold for $d_\alpha$ for NFDI can be determined, in a manner well known to those skilled in the art, for any significance level $\alpha$ using knowledge of the $\chi^2$ distribution.

Note that $\text{NFDI} = \|\eta(t)\|^2$ where $\eta(t) = R_e^{-1/2} e(t)$ and $R_e^{-1/2}$ is the matrix square root of the inverse equation error covariance matrix. $R_e^{-1/2}$ has the effect of decorrelating the equation error.

V.4.3 Normalized Filtered Fault Detection Index

In the preferred embodiment, an exponentially weighted moving average (EWMA) filter is applied to the equation errors in order to reduce the effect of transients and noise in the measured data:

$$\bar{e}(t) = \gamma \bar{e}(t-1) + (1-\gamma)e(t) \quad 0 \le \gamma < 1 \tag{32}$$

It directly follows that $$\bar{e}(t) = (1-\gamma)\sum_{k=0}^{\infty}\gamma^k e(t-k) \tag{33}$$

and $$\bar{\eta}(t) = (1-\gamma)\sum_{k=0}^{\infty}\gamma^k \eta(t-k)$$

where $$\bar{\eta}(t) = R_e^{-1/2}\bar{e}(t) \tag{34}$$

The filtered normalized fault detection index 142 is defined as $$\text{NFFDI} = \|\bar{\eta}(t)\|^2 \tag{35}$$

Without faults, since $\eta(t)$ is normally distributed, $\bar{\eta}(t)$ is also normally distributed with $E\{\bar{\eta}(t)\} = E\{\eta(t)\} = 0$. However, since the EWMA filter significantly reduces the variance of $\bar{\eta}(t)$, the confidence limit $d_\alpha$ can not be applied to $\bar{d}_\alpha$ directly. The variance of $\bar{\eta}(t)$ is given by:

$$\text{var}(\bar{\eta}(t)) = E\{\bar{\eta}^T(t)\bar{\eta}(t)\} \tag{36}$$

$$= \frac{1-\gamma}{1+\gamma}E\{\eta^T(t)\eta(t)\}\left(1 + 2\sum_{k=1}^{\infty}\gamma^k\rho(k)\right)$$

$$= \text{var}(\eta(t))\frac{1-\gamma}{1+\gamma}\left(1 + 2\sum_{k=1}^{\infty}\gamma^k\rho(k)\right)$$

where $$\rho(k) = \frac{E\{\eta^T(t)\eta(t-k)\}}{E\{\eta^T(t)\eta(t)\}} \tag{37}$$

is an autocorrelation function. If $\eta(t)$ were independently and identically distributed, $\rho(k)$ would be 0 for any k>0. However, for practical data, this condition is hardly satisfied due to dynamic transients. The non-zero $\rho(k)$ on the right hand side of equation 36 will contribute to the determination of the detection alarm threshold for $\bar{d}_\alpha$. Since the threshold for $\|\eta(t)\|^2$ is $d_\alpha$, from equation 36, it is straightforward that the detection alarm threshold 144 for $\|\bar{\eta}(t)\|^2$ is:

$$\bar{d}_\alpha = d_\alpha \left(1 + 2\sum_{k=1}^{\infty} \gamma^k \rho(k)\right) \frac{1-\gamma}{1+\gamma} \qquad (38)$$

Notice that $|\rho(k)| \leq 1$, and therefore $$\bar{d}_\alpha \leq d_\alpha \left(1 + 2\sum_{k=1}^{\infty} \gamma^k |\rho(k)|\right) 1 - \frac{\gamma}{1+\gamma} \qquad (39)$$

$$\leq d_\alpha \left(1 + 2\sum_{k=1}^{\infty} \gamma^k\right) 1 - \frac{\gamma}{1+\gamma}$$

$$= d_\alpha \left(1 + 2\frac{\gamma}{1-\gamma}\right) 1 - \frac{\gamma}{1+\gamma}$$

$$= d_\alpha$$

Therefore, the threshold for NFFDI is normally smaller than that for NFDI. In practice, $\rho(k)$ decays to zero after some time k; hence, the Detection Unit only maintains a fixed number of terms in order to calculate $\bar{d}_\alpha$. The significance $\alpha$ is an adjustable parameter of the Detection Unit.

Figure 14:
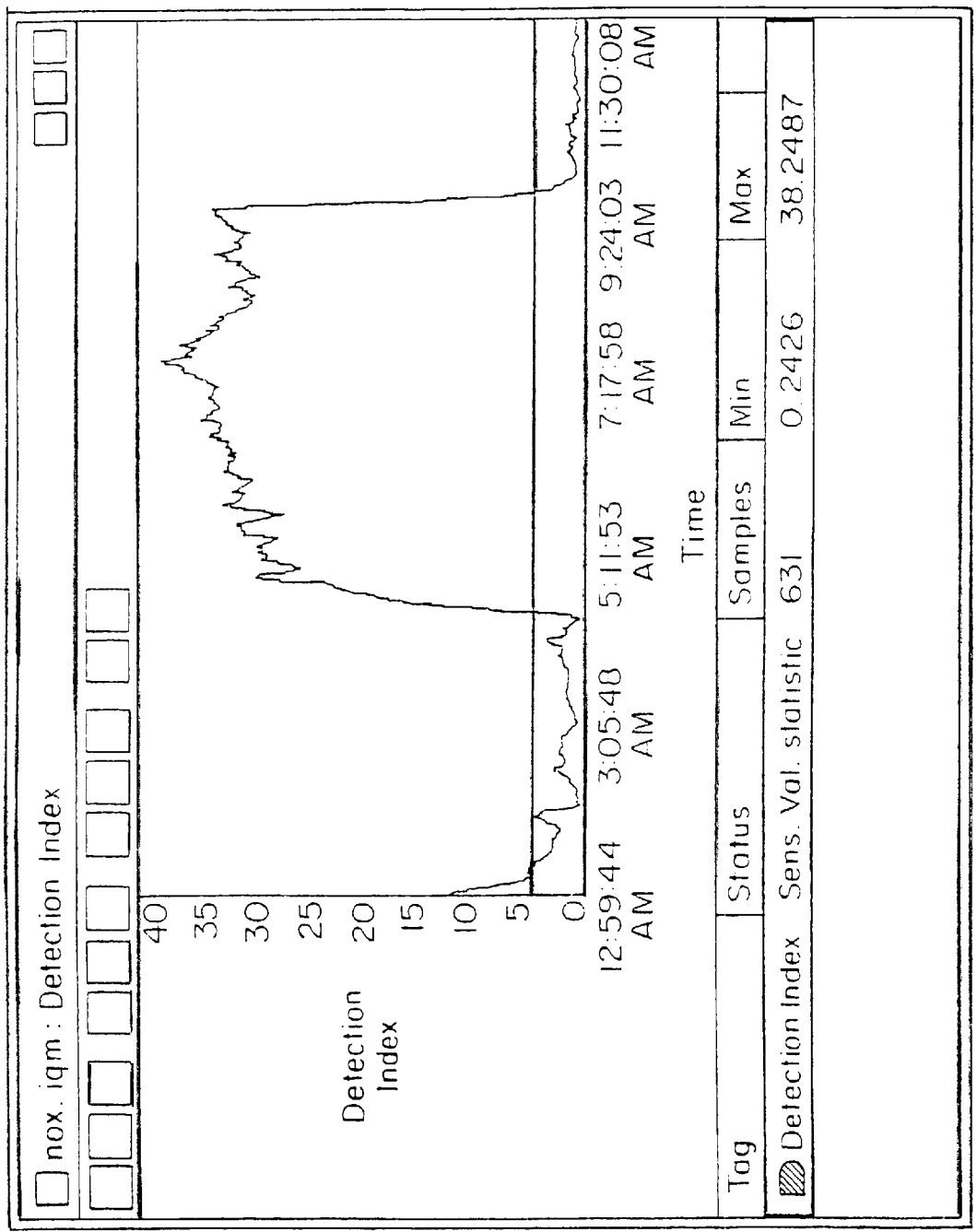
FIG. 14 shows the detection index of the present invention rapidly increasing and exceeding its threshold on the introduction of a fault to a boiler process.

FIG. 14 shows how the NFFDI rapidly increases on the introduction of a fault.

V.5 Identification Unit

The Identification Unit 150 is activated if the Detection Unit generates a detection event. The Identification Unit calculates several sets of indices 152 that are used to determine if a detected fault can be identified with the failure of one or more sensors. Each set of indices is derived from the working set of structured residuals maintained by the Structured Residual Unit 130. In general, if a single index in a set is less than a threshold, whereas all other indices in the set are greater than the threshold, then a fault of known direction is identified. The direction of this fault corresponds to directions that define the structured residual associated with the index. In the most typical case this corresponds to a fault in a single sensor.

Figure 12:
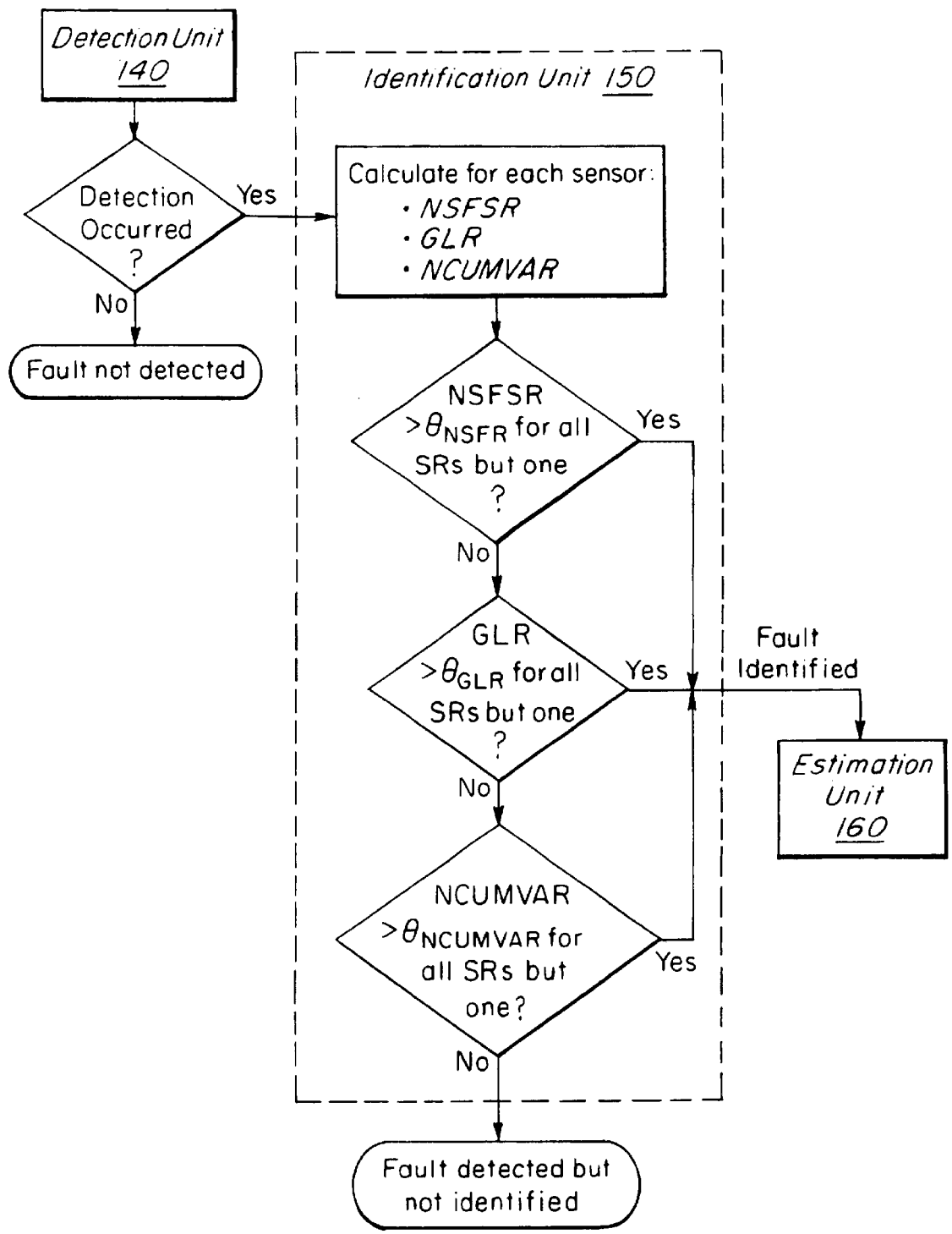
FIG. 12 shows a flow diagram of the identification process in the embodiment of FIG. 11.

In the preferred embodiment of this invention, the Identification Unit maintains 3 sets of indices 152 and their associated thresholds 154. These sets of indices are the Normalized Squared Filtered Structured Residuals (NSFSR), the Generalized Likelihood Ratio (GLR) indices, and the Normalized Cumulative Variance (NCUWVAR) indices. The associated thresholds are denoted by $\partial_{NSFSR}$, $\partial_{GLR}$, and $\partial_{NCUMVAR}$. A flow diagram that summarizes the fault identification process is shown in FIG. 12.

V.5.1 Normalized Squared Filtered Structured Residual

Ideally, each structured residual $r_i(t)$ is supposed to be zero or close to zero when no sensor fails. However, due to modeling error, measurement noise and other uncertainties, $r_i(t)$ is never equal to zero. Therefore, the non-zero confidence limit for each $r_i(t)$ i, j=1, 2, . . . , n is determined using statistical techniques.

Without a fault or with the sensor(s) associated with the $i^{th}$ structured residual being faulty, the $i^{th}$ structured residual follows a normal distribution, $$r_i(t) = w_i^T e(t) \sim N(0, w_i^T R_e w_i) \quad i=1, 2, \ldots, n \qquad (40)$$

where $R_e = E\{e(t)e^T(t)\}$ is the equation error covariance matrix.

Consequently $$\frac{r_i^2(t)}{w_i^T R_e w_i} \sim \chi^2(1) \quad i = 1, 2, \ldots, n \qquad (41)$$

Then, defining the $i^{th}$ normalized structured residual (NSR) as $$v_i(t) \equiv \frac{r_i(t)}{\sqrt{w_i^T R_e w_i}} \sim N(0, 1) \qquad (42)$$

and defining the normalized squared structured residual (NSSR) as $v_i^2(t)$, the confidence limit for NSSR is $\chi_\alpha^2(1)$ where $\alpha$ is the level of significance.

When an EWMA filter is applied to the NSR, the normalized filtered structured residual (NFSR) is $$\bar{v}_i(t) = \gamma \bar{v}_{i_t}(t-1) + (1-\gamma)v_i(t) \qquad (43)$$

$$= (1-\gamma)\sum \gamma^k v(t-k)$$

Without a fault or with the sensor(s) associated with the $i^{th}$ structured residual being faulty, the NFSR also follows a normal distribution with $$E\{\bar{v}_i(t)\} = E\{v_i(t)\} = 0$$

and $$\text{var}(\bar{v}_i(t)) = \text{var}(v_i(t))\frac{1-\gamma}{1+\gamma}\left(1 + 2\sum_{k=1}^{\infty} \gamma^k \psi_i(k)\right) \qquad (44)$$

where $$\psi_i(k) = \frac{E\{v_i(t)v_i(t-k)\}}{E\{(v_i(t))^2\}}$$

is an autocorrelation function.

Therefore the alarm threshold for the normalized squared filtered structured residual (NSFSR) defined by $\bar{v}_i^2(t)$ has an alarm threshold of $$\partial_{NSFSR}^i \equiv \bar{\eta}_i^\alpha(t) = \frac{1-\gamma}{1+\gamma}\left(1 + 2\sum_{k=1}^{\infty} \gamma^k \psi_i(k)\right)\chi_\alpha^2(1) \quad i = 1, 2, \ldots, n \qquad (45)$$

If all sensors are normal $\bar{v}_i^2(t)$ is normally below its threshold as indicated by:

$$P\{\bar{v}_i^2(t) > \partial_{NSFSR}^i\} = \alpha$$

Figure 17A:
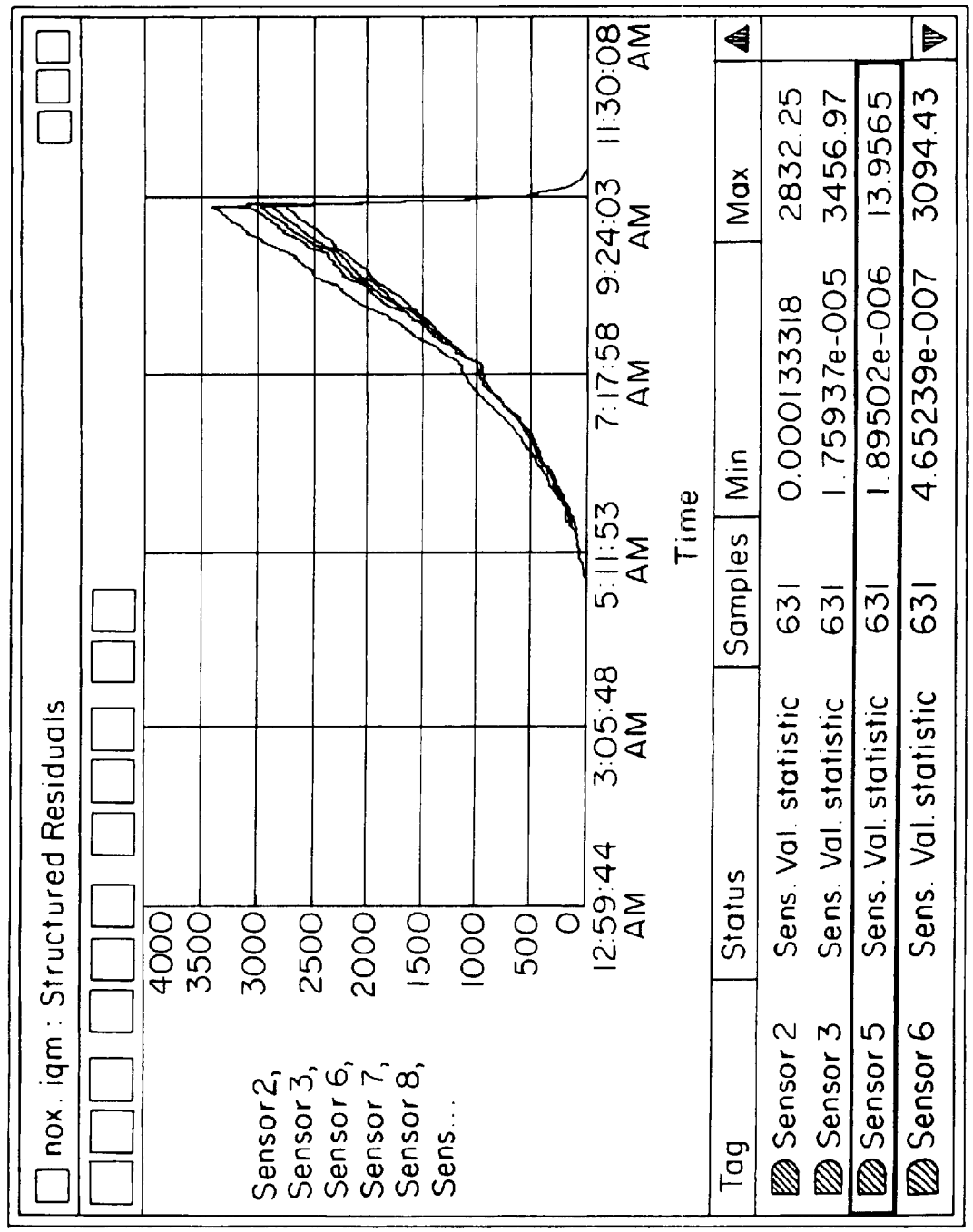
FIG. 17A and 17B show the NSFSR indices of the present invention in response to the introduction of a drift fault into sensor 5 of a boiler process.
Figure 17B:
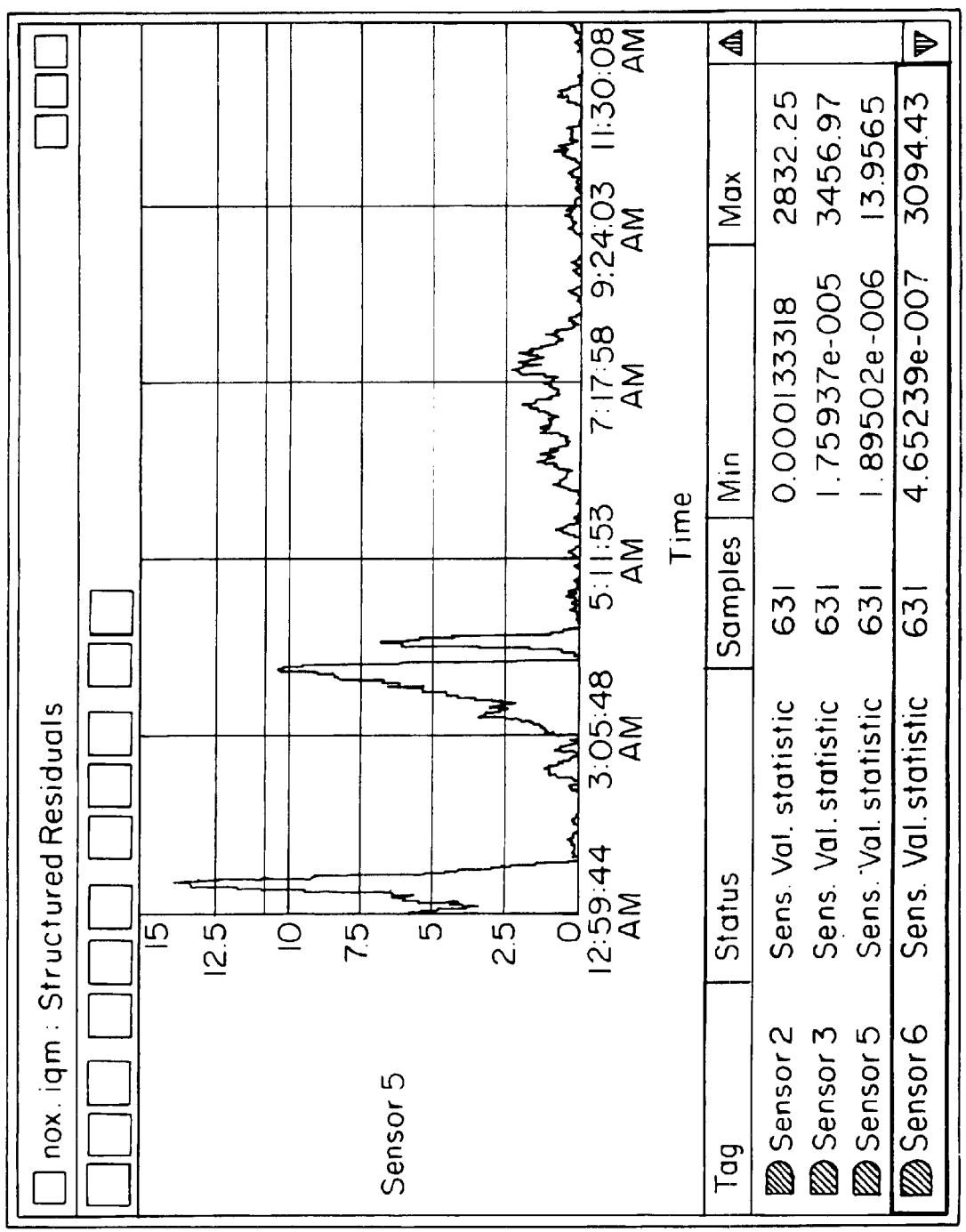

If the sensor(s) associated with the $i^{th}$ structured residual are faulty, by the SRAMS design, $\bar{v}_i^2(t)$ is not affected by the fault. However, the other residuals, $\bar{v}_j^2(t) j \neq i$, will increase significantly because their sensitivity to the faults in other sensors is maximized. Therefore, with a selected level of significance $\alpha$ and an instant t, among NSFSRs, the existence of exactly one NSFSR that is less than its threshold $\partial_{NSFSR}^i$ identifies a faulty sensor, and generates an identification event 158. An example of this is shown in FIGS. 17A and 17B in which the FIG. 17A window shows the NSFSRs that do not correspond to faulty sensor 5 become very large, whereas the FIG. 17B window shows the NSFSR for sensor 5 remains below its threshold.

Since there are often many sensors to be validated, the probability for at least one residual to exceed its threshold is significant, even though the probability for each index to exceed its threshold is small. For example, assuming that there are 20 residuals $r_i(t)$ i=1, 2, ... 20. The probability for at least one NSFSR to exceed its threshold is (assuming $\alpha=0.05$)

$$P=1-(1-\alpha)^{20}=1-0.95^{20}=0.642$$

even though all sensors are normal. Therefore, the NSFSRs are not used for fault detection. Instead, the Detection Unit uses the NFFDI to trigger a detection event after which the Identification Unit uses the various sets of indices, starting with the NSFSRs, to identify the faulty sensors.

Optionally, the NSFSR indices can be calculated at each cycle, whether or not the Detection Unit has generated a detection event. However, the index sets described in the next two sections accumulate structured residual information since the time of fault detection, so they only make sense after a detection event has been generated.

V.5.2 Generalized Likelihood Ratio Index

If a sensor fault incurs significant changes in the mean, e.g., complete failure, bias, or drift, the generalized likelihood ratio (GLR) is usually an appropriate test for detecting this (Benveniste, Basseville and Moustakides "The asymptotic local approach to change detection and model validation" *IEEE Trans. Auto. Cont.* 32 (7):538–592, July 1987.

To clarify the following analysis, each structured residual transform is assumed to correspond to a fault in a single sensor. In general, however, the GLR indices can be constructed and monitored irrespective of the structured residual design.

As shown by equation 42, when no sensor is faulty $v_i(t)$ is zero-mean and normally distributed, with unit variance. However, if the $j^{th}$ sensor becomes faulty at instant $t_f$ it is clear that $$v_i(t) = \frac{w_i^T e^*(t)}{\sqrt{w_i^T R_e w_i}} + \frac{w_i^T b_j f_j(t)}{\sqrt{w_i^T R_e w_i}} \tag{46}$$

is no longer zero-mean but the variance is unchanged. In other words $$v_i(t) \sim \begin{cases} N(0, 1) & \text{if } t < t_f \\ N(\mu_{ij}, 1) & \text{if } t \geq t_f \end{cases} \tag{47}$$

where $$\mu_{ij}(t) \equiv \frac{w_i^T b_j f_j(t)}{\sqrt{w_i^T R_e w_i}} \tag{48}$$

It should be noted that $\mu_{jj}=0$ by the SRAMS design.

To detect the mean change of $v_i(t)$, define the following GLR function $$S_{t_f}^t(\mu_{ij}) = \frac{\sum_{k=t_f}^{t} v_i^2(k) - \sum_{k=t_f}^{t}(v_i(k)-\mu_{ij})^2}{t-t_f+1} \tag{49}$$

Differentiating $S_{t_f}^t(\mu_{ij})$ with respect to $\mu_{ij}$ produces the optimal estimate of $\mu_{ij}$ $$\hat{\mu}_{ij} = \frac{\sum_{k=t_f}^{t} v_i(k)}{t-t_f+1} \tag{50}$$

With $\hat{\mu}_{ij}$, $S_{t_f}^t(\mu_{ij})$ is maximized with $$S_{t_f}^t(\hat{\mu}_{ij})=\hat{\mu}_{ij}^2 \tag{51}$$

If the $j^{th}$ sensor is faulty, $\mu_{ij}=0$, and $v_j(t) \sim N(0,1)$. From equation 50, $$\hat{\mu}_{jj}(t) \sim N(0,1)$$

or $$S_{t_f}^t(\hat{\mu}_{jj})=\hat{\mu}_{jj}^2 \sim \chi^2(1)$$

Therefore, with a selected level of significance $\alpha$ and an instant t, among the n GLRs $$S_{t_f}^t(\hat{\mu}_{1j}), S_{t_f}^t(\hat{\mu}_{2j}), \ldots, S_{t_f}^t(\hat{\mu}_{nj})$$

the existence of exactly one GLR that is less than the threshold $\partial_{GLR}=\chi_\alpha^2(1)$ identifies a faulty sensor, and generates an identification event 158.

V.5.3 Normalized Cumulative Variance Index

If a sensor incurs a precision degradation fault, the GLR index set will have difficulty identifying it. To identify the location of precision degradation faults, the mean and variance of the NSR is calculated since the time the fault occurred:

$$NCUMMEAN_i(t) = \frac{1}{t-t_f+1} \sum_{k=t_f}^{t} v_i(k)$$

$$NCUMVAR_i(t) = \frac{1}{t-t_f} \sum_{k=t_f}^{t} (v_i(k) - NCUMMEAN_i(t))^2$$

Assuming, for clarity of explanation, each structured residual transform corresponds to a fault in a single sensor, when either no sensor or the $i_{th}$ sensor fails, $$NCUMVAR_i(t) \sim \frac{1}{t-t_f} \chi^2(t-t_f-1)$$

Therefore, with a selected level of significance $\alpha$ and an instant t, among the n NCUMVARs, the existence of exactly one NCUMVAR that is less than the threshold $$\partial_{NCUMVAR} = \frac{1}{t-t_f} \chi_\alpha^2(t-t_f-1)$$

identifies a sensor with precision fault, and generates an identification event 158.

V.6 Estimation Unit

The Estimation Unit 160 is only active if the Identification Unit 150 has generated an identification event 158. The Estimation Unit then optimally estimates the fault magnitude based on the model, the faulty data, and the matrix $\Xi_j$ corresponding to the structured residual transform that was instrumental in generating the identification event. This optimal estimation is based on public domain prior art as described, for example, Martens and Naes "Multivariate Calibration", John Wiley and Sons, New York, 1989.

The optimal estimation is achieved by choosing a time function $f_q(t)$ in the direction $U_q$ where, as in equation 24, $U_q$ is the orthogonal left hand side matrix of a singular value decomposition on $B\Xi_i$ in which only non-singular values are maintained. In other words, minimize $$J=\|e^*(t)\|^2=\|e(t)-U_q f_q(t)\|^2 \tag{52}$$

A least square solution to this problem leads to:

$$\hat{f}_q(t)=U_q^T e(t) \tag{53}$$

The original fault magnitude $f_i(t)$ can be estimated using equation 25:

$$\hat{f}_i(t)=(D_q V_q^T)^+ \hat{f}_q(t) \tag{54}$$

where $(\ )^+$ is the Moore-Penrose pseudo-inverse, well known to those skilled in the art. The Structured Residual Unit 130 maintains the estimation matrix 134

$$\Xi_i(D_q V_q^T)^+ U_q^T \tag{55}$$

for each structured residual it maintains. The estimation matrix corresponding to the structured residual that identified the fault is used to map the equation error 128 to an estimate of the fault vector in the pre-processed sensor value space 136. The Estimation Unit then applies the inverse scaling 116 from the Pre-processing Unit resulting in an estimate of the fault vector in the original sensor space 168:

$$\hat{f}_u(t) = diag\left(\frac{1}{s_1}\ \frac{1}{s_2}\ \cdots\ \frac{1}{s_2}\right)\Xi_i(D_q V_q^T)^+ U_q^T e(t) \tag{56}$$

Figure 15:
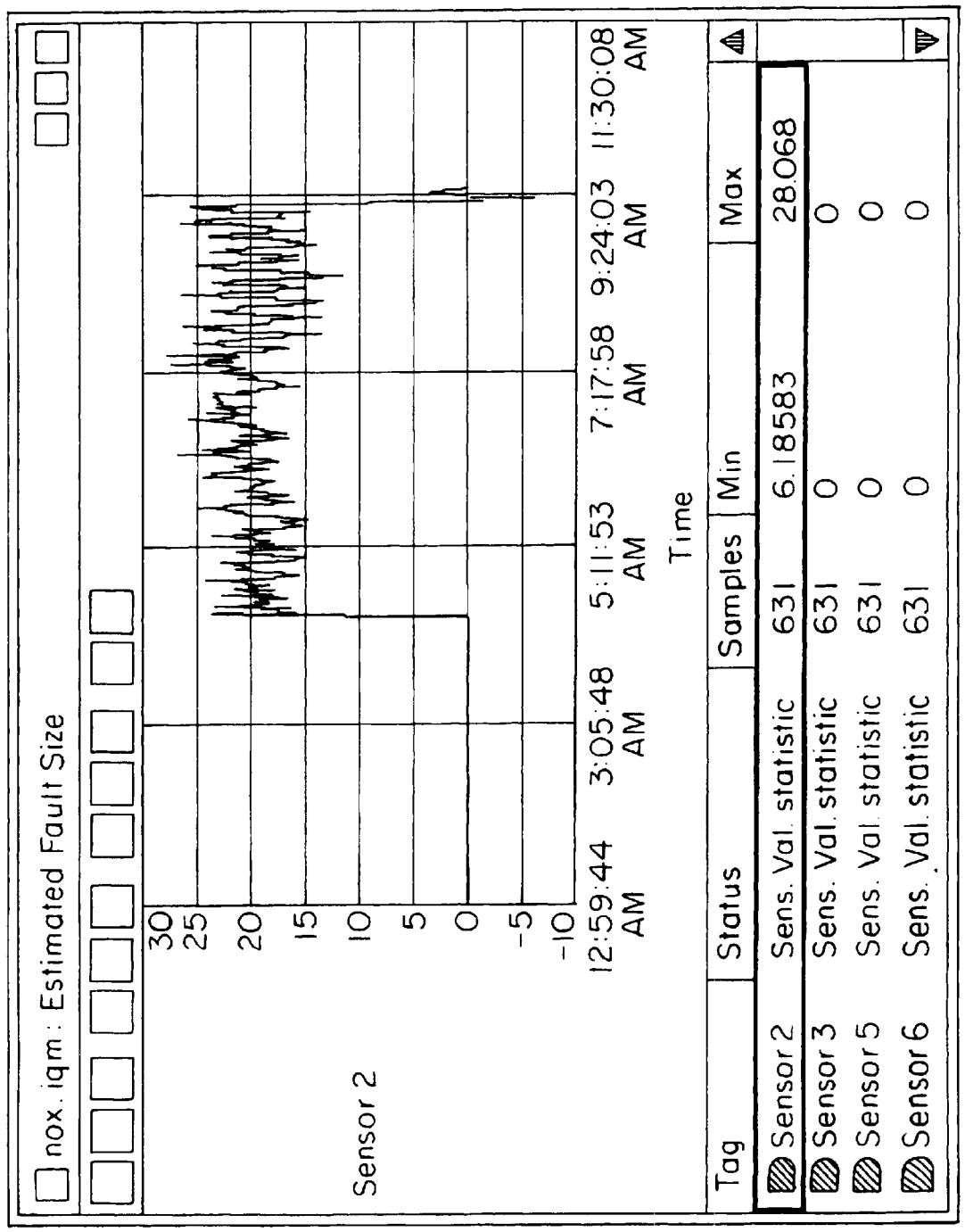
FIG. 15 shows the output of the Estimation Unit on introduction of a bias fault into sensor 2 of a boiler process.
Figure 16:
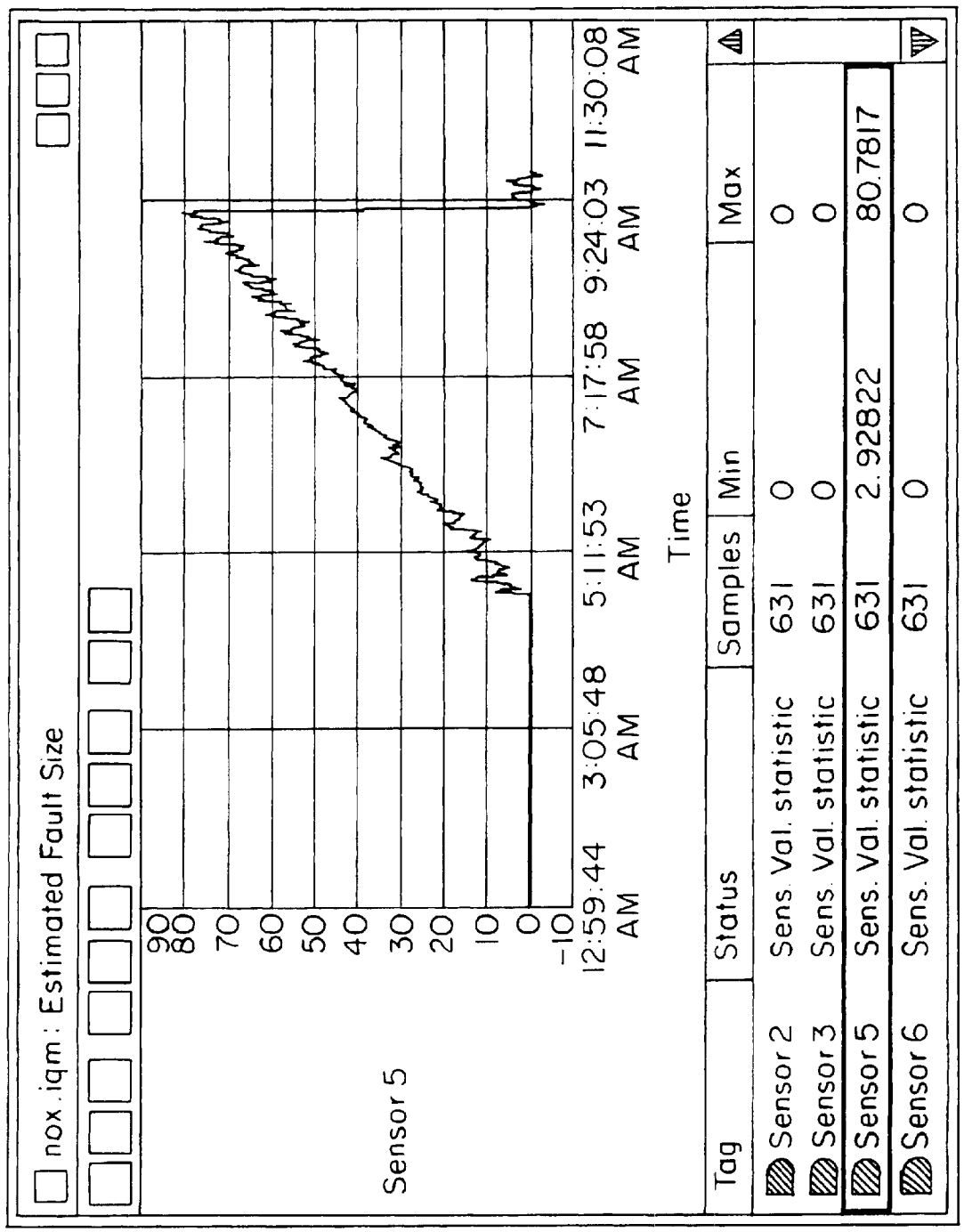
FIG. 16 shows the output of the Estimation Unit on introduction of a drift fault into sensor 5 of a boiler process.

FIG. 15 shows the output of the Estimation Unit for a bias fault in Sensor 2. FIG. 16 shows the output of the Estimation Unit for a drift fault in ensor 5. In both cases the fault size is accurately estimated.

V.7 Replacement Unit

The Replacement Unit 170 simply takes the estimate of the fault vector in the original sensor space 168 as estimated by the Estimation Unit (equation 56) and subtracts the estimated fault from the measured vector of sensor values 108 to produce a vector of replacement values 178:

$$\hat{u}(t)=u(t)-\hat{f}_u(t) \tag{57}$$

The Replacement Unit is only active if Estimation Unit 160 is active, which in turn is only active if the Identification Unit 150 has generated an identification event 158. In addition, as a safety feature, an operator of the apparatus can explicitly disable (172) the Replacement Unit.

V.8 Classification Unit

The Classification Unit 180 calculates diagnostic information as to the type of sensor fault. Specifically, four types of fault are considered: Complete Failure, Bias, Drift, and Precision Loss.

The Classification Unit is only active when an identification event 158 has occurred. From the point when a sensor is first identified as being faulty, a buffer of measured sensor values is maintained and a buffer of estimated fault sizes for that sensor is also maintained. The information in these two buffers is analyzed and used to classify the type of fault for that sensor. The analysis primarily makes use of statistical inference, so a significance level a is required which is an adjustable parameter of the Classification Unit.

Figure 13A:
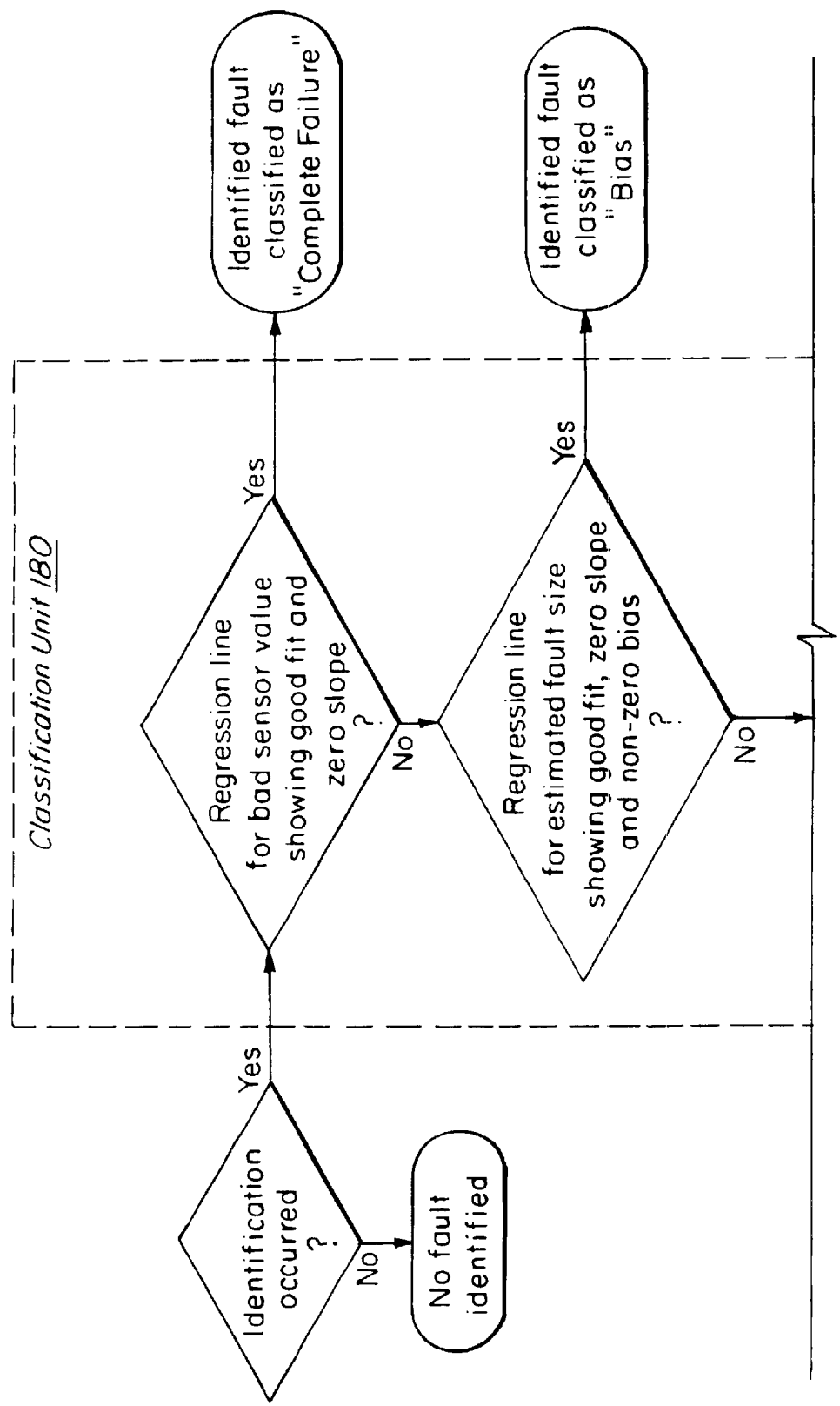
FIGS. 13A and 13B show a flow diagram of the classification process in the embodiment of FIG. 11.
Figure 13B:
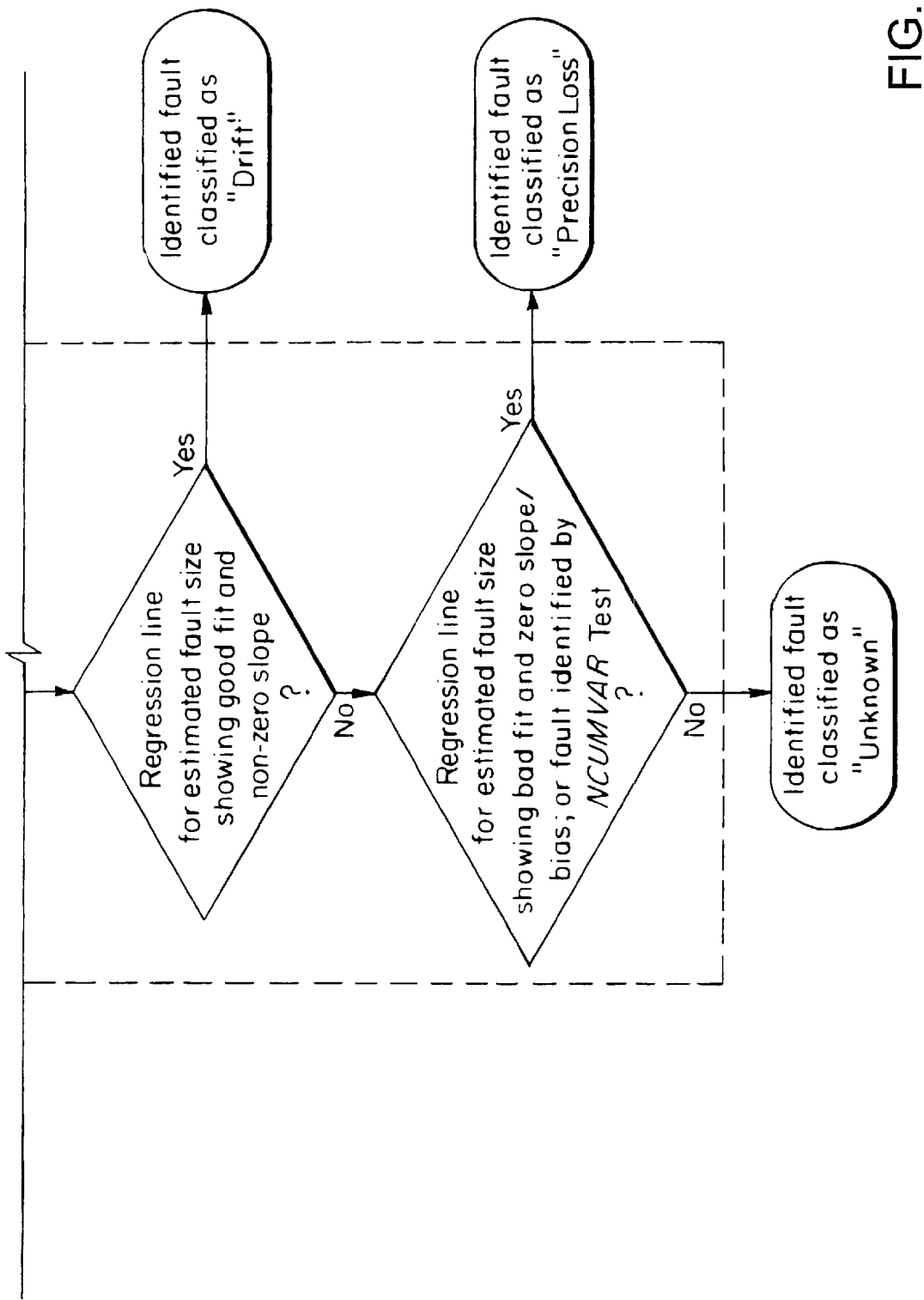

For clarity of explanation, assume that a single sensor fault has been identified by the Identification Unit 150. A flow diagram of the classification logic is shown in FIGS. 13A and 13B.

V.8.1 Classification Type: Complete Failure

Complete failure is determined by performing a regression analysis on the faulty sensor's measured values 108, and is indicated by the statistical inference that the regression line fits well, and has zero slope.

Let $\{k, u_i(k)|k=t_{id}, \ldots, t\}$ be the sequence of points for which the regression line is calculated, where $t_{id}$ is the point at which the sensor was identified as faulty, and t is the current point in time.

Using standard least squares regression, which minimizes the residual between the points and the best fit line, the slope $\beta$ and y-intercept $\alpha$ are estimated as:

$$\hat{\beta} = \frac{\sum_{k=t_{id}}^{t} (k-\bar{k})(u_i(k)-\bar{u}_i)}{\sum_{k=t_{id}}^{t} (k-\bar{k})^2} \tag{58}$$

$$\hat{\alpha} = \bar{u}_i - \hat{\beta}\bar{k}$$

where $$\bar{k} = \frac{1}{t-t_{id}+1} \sum_{k=t_{id}}^{t} k \tag{59}$$

$$\bar{x}_i = \frac{1}{t-t_{id}+1} \sum_{k=t_{id}}^{t} u_i(k)$$

To test if the slope is statistically equal to 0, construct the following statistic:

$$|t_\beta| = \frac{|\hat{\beta}|}{SD(\hat{\beta})} \tag{60}$$

where the standard deviation of $\hat{\beta}$ is given by $$SD(\hat{\beta}) = \frac{\sigma}{\sqrt{\sum_{k=t_{id}}^{t}(k-\bar{k})^2}} \tag{61}$$

and the standard deviation $\sigma$ of the residual is estimated by $$\hat{\sigma} = \sqrt{\frac{\sum_{k=t_{id}}^{t} \hat{e}_i^2(k)}{t-t_{id}-1}} \tag{62}$$

where $$\hat{e}_i(k)=u_i(k)-(\hat{\beta}k+\hat{\alpha})$$

is the residual error.

The statistic given in equation 60 satisfies Student's t distribution with $t-t_{id}-1$ degrees of freedom (see, for example Birkes and Dodge "Alternative Methods of Regression", John Wiley & Sons 1993).

Goodness of fit of the regression line is determined by the linear correlation coefficient exceeding a specified threshold.

V.8.2 Classification Type: Bias

Bias is determined by performing a regression analysis on the faulty sensor's fault size estimates 168 as calculated by Estimation Unit 160, and is indicated by the statistical inference that the regression line fits well, has zero slope, and has non-zero bias.

Let $\{k, f_s(k)|k=t_{id}, \ldots, t\}$ be the sequence of points for which the regression line is calculated, where $t_{id}$ is the point at which the sensor was identified as faulty, and t is the current point in time. Testing for zero slope is the same as for classifying Complete Failure, except that the fault size sequence $f_s(k)$ replaces the sensor value sequence $u_s(k)$. Goodness of fit of the regression line is determined by the linear correlation coefficient exceeding a specified threshold. To test for non-zero bias, calculate the statistic:

$$|t_\alpha| = \frac{|\bar{\alpha}|(t - t_{id} + 1)}{\sigma} \tag{63}$$

which also satisfies Student's t distribution with $t-t_{id}-1$ degrees of freedom.

V.8.3 Classification Type: Drift

Drift is determined by performing a regression analysis on the faulty sensor's fault size estimates 168 as calculated by Estimation Unit 160, and is indicated by the statistical inference that the regression line fits well, and has non-zero slope.

V.8.4 Classification Type: Precision Loss

Precision Loss is determined by performing a regression analysis on the faulty sensor's fault size estimates 168 as calculated by Estimation Unit 160, and is indicated by the statistical inference that the regression line does not fit well, and has zero slope, and has zero bias.

Precision Loss is also indicated if the identification event 158 was generated due to the NCUMVAR test of section V.5.3.

V.9 Equivalents

Although the foregoing details refer to particular preferred embodiments of the invention, it should be understood that the invention is not limited to these details. Substitutions and alterations, which will occur to those of ordinary skill in the art, can be made to the detailed embodiments without departing from the spirit of the invention. These modifications are intended to be within the scope of the present invention.

1. DETECTION AND IDENTIFICATION OF FAULTY SENSORS IN DYNAMIC PROCESSES WITH MAXIMIZED SENSITIVITY

Dynamic sensor validation is an important step in applying model predictive control (MPC) to industrial processes. In a typical. MPC application, hundreds of process variables are involved to determine the optimal target values for the controlled variables and manipulated variables (Qin and Badgwell, 1996). If some sensors are faulty, the optimized target values are not valid. Therefore, an effective sensor validation approach that detects and identifies faulty sensor on-line is required. Once a faulty sensor is identified, it is desirable to estimate the fault magnitude and replace the faulty sensor with the best reconstruction in order to maintain the control system on-line even though some sensors have failed.

Existing work in the area of sensor validation can be divided into three categories: (i) gross-error detection and identification based or open-loop first principles models: (ii) closed-loop observer or Kalman filter based sensor fault detection and isolation; and (iii) multivariate statistics based sensor validation using methods like principal component analysis (PCA) and partial least squares (PLS). Commonly three tasks are involved in sensor validation, including detection, identification, and reconstruction of the faulty sensors using available information.

Published work in gross error detection and identification is reviewed thoroughly in Crowe (1996). Mah et al. (1976), Stanley and Mah (1977, 1981), and Romagnoli and Stephanopoulos (1981) are among the early work in gross error detection and rectification in chemical processes. Crowe et al. (1983) propose a matrix projection approach to eliminate unmeasured variables present in the balance equations. Rollins and Davis (1992) propose an unbiased estimation technique (UBET) for the estimation of fault magnitudes. Dynamic gross error detection is studied by a number of researchers (Albuquerque and Biegler, 1996; Karjala and Himmelblau, 1996: Liebman et al., 1992). These methods typically formulate the detection of gross errors as a nonlinear program. Because a nonlinear model is involved, the computational cost is high and unique identification of the gross errors is often not guaranteed.

The literature of fault detection and isolation contains a plethora of methods for sensor validation, which often treats sensor validation as a specific task of the general fault detection problem. Most methods in this category are based on dynamic state observers or Kalman filters. Deckert et al. (1977) apply redundant hardware sensors to detect and identify abnormal sensors in an F-8 airplane. Chow and Willsky (1984) use state space models to generate parity equations for fault detection and isolation. Frank and Wunnenberg (1989) use unknown input observers to deal with process and sensor fault detection and isolation. Some of the methods reviewed in Frank and Ding (1997) are relevant to sensor validation. The use of process parity equations to generate structured residuals is described in Gertler and Singer (1990), Gertler (1991), and Gertler and Kunwer (1995). A structured residuals approach with maximized sensitivity for fault isolation in static processes is proposed by Qin and Li (1999).

Recently, the use of multivariate statistical methods for sensor validation received significant attention. Originally proposed as a process monitoring technique in Jackson (1991) and Kresta et al. (1991), the PCA and PLS methods are effective for sensor validation based on normal process data. Sensor fault identification is made possible by the use of contribution plots (Miller et al., 1993; Tong and Crowe, 1995) and a sensor validation index via reconstruction (Dunia et al., 1996). Recent work by Gertler et al. (1999) uses a set of PCA models to enhance fault isolation. The work by Tong and Crowe (1995) is among the first to apply PCA to analysis of the model residuals. Relations between several principal component tests and other traditional tests are also given. A related data-based method is the use of auto-associative neural networks as nonlinear PCA for sensor validation which is proposed in Kramer (1991). Fontoni and Mazzola (1994) apply the work of Kramer (1991) to sensor validation of nuclear power plants. In these methods, quasi-steady state models are used to detect sensor gross errors.

The fact that existing methods for sensor validation received only restricted use in practice is due one or several of the following limitations: (i) an accurate first principles model is required a priori; (ii) there is not enough sensitivity to uniquely identify the faulty sensors from normal ones;

(iii) the methods are not robust to process disturbances and other measurement errors; and (iv) only a quasi-steady state situation is considered. In this work we propose a new optimal method for the detection and identification of faulty sensors in dynamic processes using a normal subspace model. This model can be consistently identified by the use of the errors-in-variables (EIV) subspace model identification (SMI) algorithms (Chou and Verhaegen, 1997) from noisy input and output measurements with the presence of process noise. This method can also be applied to dynamic models built from first principles, system identification techniques or statistical analysis approaches. Given a normal process model, we generate a parity vector that is decoupled from the system state and contains a linear combination of current and previous inputs and outputs. By manipulating the parity vector, we generate a residual for fault detection. An exponentially weighted moving average (EWMA) filter is applied to the residual to reduce false alarms due to noise. To identify which sensor is faulty, can dynamic structured residual approach with maximized sensitivity (DSRAMS) is proposed to generate a set of residuals where one residual is most sensitive to one specified subset of faults but insensitive to others. All the structured residuals are also subject to EWMA filtering to reduce the effect of noise. The confidence limits for these filtered structured residuals (FSRs) are determined using statistical techniques. By comparing the FSRs against their respective confidence limits, faulty sensors can be readily identified. In addition, in order to identify different types of faults, other indices such as the generalized likelihood ratio (GLR) and the cumulative variance (Vsum) are applied and compared. After the identification of the faulty sensors the fault magnitude is then estimated based on the model and faulty data, and the faulty sensors are reconstructed. Data from a simulated process and an industrial waste water reactor are used to test the effectiveness of the proposed scheme, where four types of sensor faults, including bias, precision degradation, drifting, and complete failure are simulated.

This paper is organized as follows. Section 2 describes the design of a model residual for fault detection that is decoupled from the state variables. Details of the DSRAMS method for fault identification are given in Section 3, including fault identification indices, the optimal estimate of the fault magnitude, and the reconstruction of faulty sensors based on the normal model and faulty data. Section 4 proposes an errors-in-variables subspace identification approach tailored for fault detection and identification. Two case studies on a simulated dynamic process and an industrial waste water reactor process are carried out in Section 5. Finally, conclusions are given in Section 6.

2. FAULT DETECTION IN DYNAMIC SYSTEMS

In this section we use a state space model to formulate the dynamic fault detection problem. In this formulation we assume measurement noise is present in both output and input sensors. Process noise is also included in this formulation. The model can be derived using a subspace identification method that handles the errors-in-variables (EIV) situation (e.g., Chou and Verhaegen, 1997), but it can also be derived from first principles. Since in model predictive control applications a dynamic model is already available, we will also discuss the use of a dynamic transfer function model or finite impulse response (FIR) model for fault detection.

2.1 Model and Fault Representation

A general errors-in-variables dynamic process model can be represented by the following state space formulation (Chou and Verhaegen, 1997), $$x(t+1)=Ax(t)+B[u(t)-v(t)]+p(t)$$

$$y(t)=Cx(t)+D[u(t)-v(t)]+o(t) \quad (1)$$

where $u(t) \in R^l$, $y(t) \in R^m$, and $x(t) \in R^n$ are input, output and state variables respectively; A, B, C and D are system matrices with appropriate dimensions. $v(t)$, $o(t)$ and $p(t)$ are input, output and process noises, respectively. By manipulating Eqn. 1, we obtain $$y_s(t)=\Gamma_s x(t-s)+H_s u_s(t)-H_s v_s(t)+G_s p_s(t)+o_s(t) \quad (2)$$

where the extended observability matrix $\Gamma_s$ and other matrices are defined as, $$\Gamma_s = \begin{bmatrix} C \\ CA \\ \vdots \\ CA^S \end{bmatrix} \in R^{m_s \times n} \quad (3)$$

$$H_s = \begin{bmatrix} D & & \\ CB & D & \\ \vdots & & \ddots \\ CA^{s-1}B & & D \end{bmatrix} \in R^{m_s \times l_s} \quad (4)$$

$$G_s = \begin{bmatrix} 0 & & \\ C & 0 & \\ \vdots & & \ddots \\ CA^{s-1} & & 0 \end{bmatrix} \in R^{m_s \times n_s} \quad (5)$$

The extended vectors $y_s(t)$, $v_s(t)$, $o_s(t)$, $p_s(t)$, and $u_s(t)$ are defined similarly in the following form, $$y_s(t) = \begin{bmatrix} y(t-s) \\ \vdots \\ y(t-1) \\ y(t) \end{bmatrix} \quad (6)$$

Further, $m_s=(s+1)m$, $n_s=(s+1)n$, $l_s=(s+1)l$, and $s \leq n$ is the observability index. Defining $$z_s(t) = \begin{bmatrix} y_s(t) \\ u_s(t) \end{bmatrix} \in R^{m_s+l_s}, \quad (7)$$

we can rewrite Eqn. 2 as $$[I-H_s]z_s(t)=\Gamma_s x(t-s)-H_s v_s(t)+G_s p_s(t)+o_s(t) \quad (8)$$

If a sensor is faulty, its measurement will contain the normal values of the process variables and the fault. Therefore, we represent the input and output sensor faults as follows:

$$z_s(t)=z_s^m(t)+\Xi_s f_s(t) \quad (9)$$

where $$z_s^m(t) = \begin{bmatrix} y_s^m(t) \\ u_s^m(t) \end{bmatrix}$$

is the fault-free portion of the variables. The matrix $\Xi_i \in R^{(m_s+l_s) \times l_i}$ is orthogonal representing the fault direction and $f_i(t) \in R^{l_i}$ is the fault magnitude vector. To represent a single sensor fault $\Xi_i$ is an $(m_s+l_s) \times (s+1)$ matrix, i.e., $l_i=s+1$, which is multi-dimensional. This is different from the static fault detection case in Qin and Li (1999) where a single sensor fault is uni-dimensional. Furthermore, actuator faults can also be represented in this form, but in this paper we mainly consider sensor faults.

Since s is the observability index, it is necessary and sufficient to have (s+1) blocks in the matrix $\Gamma_s$ and Eqn. 8 in order to completely represent the redundancy of the process. This can be shown by denoting the characteristic polynomial of A as $$|\lambda I_n - A| = \sum_{i=0}^{n} a_i \lambda^i$$

and denoting $$\Phi = [a_0 I_m, a_1 I_m, \ldots, a_s I_m]$$

The Cayley-Hamilton theorem gives, $$\Phi \Gamma_s = 0$$

Therefore, premultiplying Eqn. 8 by $\Phi$ gives:

$$\Phi[I-H_s]z_s(t) = \Phi[-H_s v_s(t)+G_s p_s(t)+o_s(t)] \quad (10)$$

which equals to zero in the absence of noise. Equation 10 provides m equalities to represent the redundancy among the input-output variables. If more than (s+1) blocks are included in $\Gamma_s$, the additional blocks will be dependent on the first (s+1) blocks. If fewer than (s+1) blocks are included in $\Gamma_s$, the represented redundant equations could be less than the number of outputs m, which is insufficient.

2.2 Fault Detection

To use Eqn. 8 for fault detection, we must eliminate the unknown state vector x(t−s). We denote $\Gamma_s^\perp \in R^{m_s \times [m_s-n]}$ as the orthogonal complement of $\Gamma_s$ with linearly independent columns such that $$(\Gamma_s^\perp)^T \Gamma_s = 0$$

Pre-multiplying Eqn. 8 by $(\Gamma_s^\perp)^T$ leads to $$B_s z_s(t) = e(t) \in R^{m_s-n} \quad (11)$$

where $$B_s \equiv (\Gamma_s^\perp)^T [I-H_s] \quad (12)$$

$$e(t) \equiv (\Gamma_s^\perp)^T [-H_s v_s(t)+G_s p_s(t)+o_s(t)] \quad (13)$$

Chow and Willsky (1984) used this method to eliminate unknown states. This technique of eliminating unknown variables is also used in Crowe (1983) for steady state data reconciliation.

The matrix $\Gamma_s^\perp$ can be derived in several ways. If the process matrices {A, B, C, D} are known, then we can choose $(\Gamma^\perp)^T = \Phi$ using the Cayley-Hamilton theorem. In the case that an SMI method is used to identify the model, we need only to identify $B_s$ directly from the data, avoiding the need to estimate the {A, B, C, D} matrices. This approach is more practical and will be discussed in detail later.

Substituting Eqn. 9 into Eqn. 11 gives, $$e(t) = B_s[z_s^*(t) + \Xi_i f_i(t)] \quad (14)$$

$$= e^*(t) + B_s \Xi_i f_i(t)$$

where $e^m(t) = e(t)|_{f_i=0} = -H_s v_s(t) + G_s p_s(t) + o_s(t)$ is the model residual under normal conditions. Since $e^m(t)$ contains the measurement noise and process noise which are Gaussian, $e^m(t)$ is also Gaussian (Anderson, 1984), $$e^m(t) \sim N(0, R_e) \quad (15)$$

Consequently, $$e^{mT}(t) R_e^{-1} e^m(t) \sim \chi^2(m_s-n) \quad (16)$$

where $$R_e \equiv E\{e^m(t) e^{mT}(t)\}$$

is the covariance matrix of $e^m(t)$ and can be estimated from normal process data. Therefore, we can define the following fault detection index, $$d = e^T(t) R_e^{-1} e(t) \quad (17)$$

with its confidence limit is $d_\alpha = \chi_\alpha^2(m_s-n)$, where $\alpha$ is the level of significance.

To reduce the effect of noise in the model residual, an exponentially weighted moving average (EWMA) filter can be applied to e(t) as follows, $$\bar{e}(t) = \gamma \bar{e}(t-1) + (1-\gamma) e(t) \quad (18)$$

where $0 \leq \gamma < 1$. From Eqn. 18, it directly follows that $$\bar{e}(t) = (1-\gamma) \sum_{j=0}^{\infty} \gamma^j e(t-j)$$

which is also normally distributed. Therefore, we define a filtered detection index $$\bar{d} = \bar{e}^T(t) \bar{R}_e^{-1} \bar{e}(t) \sim \chi^2(m_s-n) \quad (19)$$

where $\bar{R}_e$ is the covariance matrix of $\bar{e}(t)$ which can also be estimated from normal process data. If, for a new sample, $\bar{d} \leq \chi_\alpha^2(m_s-n)$, the process is normal; otherwise, a fault has been detected.

2.3 Extension to Other Forms of Dynamic Models

Although the DSRAMS is proposed in terms of a subspace model, it can also be directly applied to many types of dynamic models, e.g., state space, ARX, and FIR models. If the state space matrices A, B, C, and D are available, we can simply convert them into $\Gamma_s$ and $H_s$ using Eqns. 3 and 4. Theu we can calculate the subspace model $B_s$ based on $\Gamma_s$ and $H_s$. If the system model is described by the following ARX model, $$y(t) + A_1 y(t-1) + \ldots + A_{m_y} y(t-m_y) B_1 u(t-1) + \ldots + B_{m_u} u(t-m_u) + v(t)$$

we can use the following augmented matrix $$[I, A_1, \ldots, A_{m_y}, B_1, \ldots, B_{m_u}] \quad (20)$$

to replace the subspace model $B_s$ in Eqn. 11. If the system model is described by an FIR model, we can replace the subspace model in Eqn. 11 by $$[I, B_1, \ldots, B_{m_u}] \tag{21}$$

3. FAULT IDENTIFICATION WITH MAXIMIZED SENSITIVITY

After the fault detection index triggers an alarm, the faulty sensors must be identified subsequently. Gertler and Singer (1985, 1990) develop a structured residual approach that isolates faults by rotating the model residuals to generate a set of structured residuals. A structured residual is designed so that it is insensitive to one fault or a group of faults while sensitive to others. The design logic for all possible faults forms an incidence matrix which relates the faults to the set of structured residuals. For example, for the case of four sensors and three model residuals, the incidence matrix which is insensitive to one fault while sensitive to others has the following form, $$\begin{array}{c} \phantom{r_1} \\ r_1 \\ r_2 \\ r_3 \\ r_4 \end{array} \begin{array}{cccc} f_1 & f_2 & f_3 & f_4 \\ \left[\begin{array}{cccc} 0 & 1 & 1 & 1 \\ 1 & 0 & 1 & 1 \\ 1 & 1 & 0 & 1 \\ 1 & 1 & 1 & 0 \end{array}\right] \end{array}$$

where "0" means insensitive and "1" means sensitive. To maximize the ability to isolate different faults, Qin and Li (1999) propose a structured residual approach with maximized sensitivity (SRAMS) for a steady state process. In the SRAMS method the structured residuals are designed to be insensitive to one group of faults while being most sensitive to others using available degrees of freedom. The resulting structured residuals are unique in this design. In this section, we extend the SRAMS method to the case of dynamic processes, deriving a dynamic structured residual approach with maximized sensitivity (DSRAMS).

3.1 Dynamic SRAMS Method

For the static model-based fault detection and identification, a single sensor fault affects only one element of the measurement vector. However, for the dynamic model-based fault identification, even a single sensor fault affects multiple elements of the measurement vector $z_s(t)$, resulting in a multi-dimensional fault. Therefore, we present the DSRAMS fault identification method for the case of multi-dimensional faults, which considers single sensor faults as a special case.

For multi-dimensional faults, the product matrix $B_s\Xi_i$ in Eqn. 14 can have linearly dependent columns even though $\Xi_i$ is orthogonal. In this case, we perform singular value decomposition (SVD) for this matrix, $$B_s\Xi_i = U_i D_i V_i^T \tag{22}$$

where $U_i \in R^{[m_s-n] \times l_i}$, $V_i \in R^{[m_s+l_s] \times l_i}$, $D_i \in R^{l_i \times l_i}$ contains the non-zero singular values, and $\bar{l}_i$ the number of non-zero singular values. Equation 14 can be rewritten as:

$$e(t) = e^m(t) + U_i D_i V_i^T f_i(t) = e^m(t) + U_i \bar{f}_i(t) \tag{23}$$

where $$\bar{f}_i(t) = D_i V_i^T f_i(t) \tag{24}$$

is the fault magnitude projected on $U_i$.

To identify the faulty sensors using DSRAMS, we need to generate a set of structured residuals in which the $i^{th}$ residual $r_i(t)$ is insensitive to a group of sensor faults (including the $i^{th}$ sensor fault) and most sensitive to others. Defining $$r_i(t) = w_i^T e(t) \tag{25}$$
$$= w_i^T e^*(t) + w_i^T U_i \bar{f}_i(t)$$

where $w_i \in R^{m_s-n}$ must be orthogonal to the columns of $U_i$ while having minimum angles to the column is of other fault matrices $U_j$ for $j \neq i$. Mathematically, this criterion to design $w_i$ for $i=1, \ldots, m_f$, where $m_f$ is the total number of faults, is equivalent to $$\max_{w_i} \sum_{j=1}^{m_j} \|U_j^T w_i\|^2 \tag{26}$$

subject to $$U_i^T w_i = 0 \text{ and } \|w_i\| = 1$$

Therefore, we choose $w_i$ in the orthogonal complement of $U_i$, that is $$w_i = (I - U_i U_i^T)\omega_i \tag{27}$$

The objective (26) now becomes $$\max_{\omega_i} \sum_{j=1}^{m_j} \|U_j^T(I - U_i U_i^T)\omega_i\|^2 = \sum_{j=1}^{m_j} \max_{\omega_i} \|U_{ji}^T \omega_i\|^2 \tag{28}$$

subject to:

$$\|(I - U_i U_i^T)\omega_i\| = 1 \tag{29}$$

where $$U_{ji} = (I - U_i U_i^T) U_j \tag{30}$$

is the projection of $U_j$ on the orthogonal complement of $U_i$. Applying a Lagrange multiplier, $\omega_i$ is found to be the solution to the following equation.

$$\sum_{j=1}^{m_j} U_{ji} U_{ji}^T \omega_i = \lambda(I - U_i U_i^T)\omega_i \tag{31}$$

Rearranging Eqn. 30, we obtain, $$U_{ji} = (I - U_i U_i^T) U_j = (I - U_i U_i^T)^2 U_j = (I - U_i U_i^T) U_{ji}$$

Therefore, Eqn. 31 becomes $$\sum_{j=1}^{m_j} U_{ji} U_{ji}^T (I - U_i U_i^T)\omega_i = \lambda(I - U_i U_i^T)\omega_i \tag{32}$$

Using Eqn. 27 again we have $$\sum_{j=1}^{m_j} U_{ji} U_{ji}^T w_i = \lambda w_i \tag{33}$$

Therefore, $w_i$ is simply the eigenvector of $\sum_{j=1}^{m_f} U_{ji} U_{ji}^T$ associated with the largest eigenvalue. Note that only this largest eigenvalue satisfies the sufficient condition for the objective in Eqn. 28 to achieve the maximum.

It should be noted that one can design a structured residual to be insensitive to several sensor faults while most sensitive to others, as long as there are enough degrees of freedom available. One must satisfy the isolability condition in this design (Gertler and Singer, 1990). The detailed algorithm is similar to the one described above, except that several fault direction matrices should be included in Eqn. 22.

3.2 Fault Identification Indices

After the structured residuals are generated, decision about which sensor fails has to be made. Due to modeling errors, measurement noise and other uncertainties, the residuals $r_i(t)$ are not equal to zero. From Eqn. 25, we can infer that if there is no fault, $$r_i(t) = w_i^T e^m(t) \sim N(0, w_i^T R_e w_i) \quad i=1, 2, \ldots, m_f. \tag{34}$$

If the jth fault occurs, the residuals $$r_i(t) \sim \begin{cases} \mathcal{N}(0, w_i^T R_e w_i) & \text{if } i = j, \\ \mathcal{N}(\mu_{ij}, w_i^T R_e w_i) & \text{if } i \neq j. \end{cases}$$

where $$\mu_{ij} = w_i^T U f_j(t) \tag{35}$$

Consequently, if there is no fault.

$$\frac{r_i^2(t)}{w_i^T R_e w_i} \sim \chi^2(1) \tag{36}$$

Therefore, we could use $r_i^2(t)$ as a fault identification index.

In order to reduce the effect of random noise and modeling errors, these residuals often have to be filtered before being used for fault identification. Further, several types of indices are required to be sensitive to different types of faults. For examples using a low-pass filter will identify bias type of faults easily, but it will not be sensitive to faults with high frequency changes. On the other hand, a fault identification index without filtering will give false identification due to noise. Qin and Li (1999) provide four type of indices to deal with this issue: (i) an EWMA filtered structured residual (FSR); (ii) a generalized likelihood ratio (GLR) based on the structured residuals; (iii) a cumulative sum (Qsum) of the structured residuals; and (iv) a cumulative variance (Vsum) index. The EWMA based FSR provides smoothing to the residuals so that high frequency noise will not cause false alarms. The GLR and Qsum are essentially equivalent which use a rectangular moving window to filter the noise. The Vsum index is specifically designed to identify precision-degradation faults which have large variance changes.

3.2.1 EWMA Filtered Structured Residuals

When an EWMA filter is applied to $r_i(t)$, the filtered structured residual is $$\bar{r}_i(t) = \gamma \bar{r}_i(t-1) + (1-\gamma) r_i(t) \sim N(0, w_i^T R_e w_i) \tag{37}$$

when there is no fault. When the jth fault occurs, we can use the following FSR index to identify the faulty sensor:

$$I_{FSR}^i(t) \equiv \frac{\bar{r}_i^2(t)}{w_i^T R_e w_i \chi_\alpha^2(1)} \begin{cases} \leq 1 & \text{if } i = j, \\ > 1 & \text{if } i \neq j. \end{cases}$$

This will allow us to identify the faulty sensor.

3.2.2 Generalized Likelihood Ratios

If a sensor fault incurs significant changes in the mean, e.g., bias or drift, the generalized likelihood ratio test is usually appropriate to use (Benveniste, et al., 1987; Basseville, et al., 1993). If sensor j is faulty, the GLR for the ith structured residual is (Qin and Li, 1999)

$$S_t(\hat{\mu}_{ij}) = \frac{t_w \hat{\mu}_{ij}^2}{w_i^T R_e w_i} \sim \chi^2(1), \text{ for } i = j \tag{38}$$

because $$\hat{\mu}_{ij} = \frac{1}{t_w} \sum_{k=t-t_w+1}^{t} r_i(k) \sim \mathcal{N}\left(0, \frac{w_i^T R_e w_i}{t_w}\right), \text{ for } i = j \tag{39}$$

where $[t-t_\omega+1, t]$ is the time window that include the faulty period and $t_{107}$ the window width. Therefore, if sensor j is faulty, $$S_t(\hat{\mu}_{ij}) \leq \chi_\alpha^2(1) \text{ for } i=j,$$

$$S_t(\hat{\mu}_{ij}) > \chi_\alpha^2(1) \text{ for } i \neq j.$$

We then define a GLR index as follows, $$I_{GLR}^i(t) = \frac{S_t(\hat{\mu}_{ij})}{\chi_\alpha^2(1)} \tag{40}$$

Under normal conditions, $I_{GLR}^i(t)$ (i=1, 2, . . . , $m_f$) are less than one. If sensor j is faulty, $I_{GLR}^i(t)$ will be less than one for i=j, but all other $I_{GLR}^i(t)$ (i≠j) will be larger than one.

3.2.3 Cumulative Variance Index

If a sensor incurs a precision degradation fault (i.e., mainly variance changes), both FSR and GLR will have difficulty identifying it. In this case, we can use a cumulative variance index, $$V_{sum}^i(t) = \sum_{k=t-t_w+1}^{t} (r_i(k) - \hat{\mu}_{ij}), \, i = 1, 2, \ldots, m_f \tag{41}$$

Under normal conditions, the following ratio follows a Chi-square distribution with ($t_\omega-1$) degree of freedom (Hald, 1952), $$\frac{V_{sum}^i(t)}{w_i^T R_e w_i} \sim \chi^2(t_w - 1)$$

Therefore, we define a normalized index for Vsum, $$I_{Vsum}^i(t) = \frac{V_{sum}^i(t)}{w_i^T R_e w_i \chi_\alpha^2(t_w - 1)} \tag{42}$$

A value above one for this index indicates an abnormal situation. If sensor j is faulty, $$I_{Vsum}^i(t) \leq 1 \text{ for } i=j,$$

$$I_{Vsum}^i(t) > 1 \text{ for } i \neq j.$$

3.3 Fault Estimation

With the presence of a sensor fault, as shown by Eqn. 14, e(t) increases in magnitude. Since the fault direction as been identified, we choose a time function $f_i(t)$ in the direction of $B_s \Xi_i$ to minimize the effect of the fault on e(t), that is, to minimize $$J = \|e^m(t)\|^2 = \|e(t) - B_s \Xi_i f_i(t)\|^2 \tag{43}$$

A least squares estimate for the fault magnitude is $$\hat{f}_i(t) = (B_s \Xi_i)^+ e(t) \tag{44}$$

where ( )$^+$ stands for the Moore-Penrose pseudo inverse (Albert, 1972). Note that $\hat{f}_i(t)$ contains the estimates of the fault values consecutively from t−s through t. Since we are usually interested in estimating the current fault value, we only have to compute the associated rows in $\hat{f}_i(t)$.

3.4 Isolating Sensor Faults from Process Changes

Although the ultimate objective of this work is to detect and identify sensor faults, process changes, whether normal or abnormal, can interfere with the sensor validation results and cause false alarms. Therefore, it is important to distinguish sensor faults from process changes.

Typically, process changes can be classified into three categories:

(i) unmeasured, normal process disturbances;

(ii) slow process degradation which may or may not lead to a process fault; and (iii) abnormal process changes which prohibit the process from functioning normally.

These process changes can be further divided into two types: additive and multiplicative changes. For example leakage in a pipeline system is a typical additive fault, while a process parameter variation is a typical multiplicative fault. Unmeasured process disturbances can affect the process either as an additive changes (such as ventilation) or as a multiplicative change (such as inlet concentration). In principle, both additive and multiplicative changes affect the residuals differently from sensor faults. Therefore, they can be distinguished from sensor faults. To deal with the effect of additive changes $d(t) \in R^{n_d}$, we can write e(t) and the structured residuals as follows assuming that no sensor faults occur, $$z_s(t) = z_s^m(t) + \Xi_d d(t)$$

$$e(t) = B_s z_s^m(t) + B_s \Xi_d d(t)$$

$$r_i(t) = w_i^T B_s z_s^m(t) + w_i^T B_s \Xi_d d(t) \quad i = 1, 2, \ldots, m_f \tag{45}$$

where $\Xi_d$ is the direction in which the process fault affects the measurement. As long as $\Xi_d$ does lot overlap with any one of the sensor fault directions $\Xi_i$, all structured residuals are affected by the fault. Therefore, based on this analysis we can distinguish sensor faults from process disturbances or faults.

Multiplicative process faults typically lead to a change in the process model. For example, we call have the process matrix $$B_{s,p} = B_s + \Delta B_s$$

The structured residuals are still generated based on the model matrix $B_s$, that is, $$r_i(t) = w_i^T B_s z_s(t) = w_i^T B_{s,p} Z_s(t) - w_i^T \Delta B_s z_s(t)$$

$$= w_i^T e_s^*(t) - w_i^T \Delta B_s z_s(t)$$

The first term on the RHS of the above equation is random noise that defines the confidence limit, while the second term is the effect of multiplicative process changes.

Since the process parameter change $\Delta B_s$ is typically unknown before hand and does not coincide with a sensor fault direction, multiplicative process changes will affect all residuals $r_i(t)$ for $i=1, \ldots, m_f$. Therefore, multiplicative process faults can also be distinguished from sensor faults. In summary, if the fault detection index detects a faulty situation, and all structured residuals are affected, it is likely a process change instead of a sensor fault.

3.5 Comparison to the Conventional Structured Residual Approach

Chow and Willsky (1984) originally present the idea of fault detection based on the system subspace model. Then Gertler (1991) introduces a structured residual approach to this framework so that the Chow-Willsky scheme is improved to possess the ability of fault identification. Based on this conventional structured residual approach (Gertler, et al., 1985, 1990), each $w_i$ is chosen such that it makes the $i^{th}$ structured residual $r_i(t)$ insensitive to particular faults of interest, but it fails to make this structured residual most sensitive to the other faults. In a typical structured residual design, the selection of $w_i$ is not unique and somewhat arbitrary. The arbitrariness in this design leads to a suboptimal solution which does not maximize the potential to identify faults.

With the proposed DSRAMS, we achieve a unique design $w_i$, which maximizes the sensitivity for identifying the fault and minimizes possible ambiguity.

4 CONSISTENT ESTIMATION OF THE EIV SUBSPACE MODEL

In order to carry out the fault detection and identification task, we must have a dynamic model of the normal process as shown in Eqn. 1. One way of building such a state space model is to use subspace identification methods. Recently, many types of subspace identification algorithms are available (e.g., Van Overschee and De Moor, 1994; Ljung, 1999). Because most of them assume that the system input is noise-free (Verhaegen, 1994; Van Overschee and De Moor, 1994), these algorithms give biased estimates for the EIV model in Eqn. 1 (Chou and Verhaegen, 1997).

To identify a consistent model from noisy input-output observations, Moonen et al. (1990) propose an EIV subspace-based identification method using QSVD (quotient singular value decomposition). This scheme gives consistent estimates of the system matrices {A, B, C, D} under the assumption that the input and output are corrupted with white noise. The EIV SMI algorithm proposed by Chou and Verhaegen (1997) does not require the noise to be white; instead, it requires that he noise be finitely auto-correlated and cross-correlated. In other words, the covariance of the noise is $$E\left\{\begin{bmatrix} p(t) \\ v(t) \\ o(t) \end{bmatrix} \begin{bmatrix} p^T(j) & v^T(j) & o^T(j) \end{bmatrix}\right\} = \begin{bmatrix} \sum_p & \sum_{pv} & \sum_{po} \\ \sum_{pv}^T & \sum_v & \sum_{vo} \\ \sum_{po}^T & \sum_{vo}^T & \sum_o \end{bmatrix} \delta_{t,j} \quad (46)$$

where $\delta_{t,j}$ is the Kronecker Delta function.

Most of the SMI methods involve two steps in the identification: (i) estimate the subspace of the extended observability matrix $\Gamma_s$; and (ii) estimate $\{A, B, C, D\}$ from the extended matrices. For the purpose of fault detection and identification, however, we only need to identify the matrix $B_s$ in Eqn. 11. Since from Eqn. 12, $$B_s = [\Gamma_s^\perp - \Gamma_s^\perp H_s] \quad (47)$$

we propose an EIV method to identify $B_s$ by estimating $-\Gamma_s^\perp H_s$ and $\Gamma_s^\perp$ directly from noisy input and output data.

Given the corrupted input and output measurements $\{u(t)\}$ and $\{y(t)\}$ for $t=1, 2, \ldots, N+2s$, we can formulate the following block Hankel matrices, $$U_t = [u_s(t+s) u_s(t+s+1) \cdots u_s(t+s+N-1)] \quad (48)$$
$$= \begin{bmatrix} u(t) & u(t+1) & \cdots & u(t+N-1) \\ u(t+1) & u(t+2) & \cdots & u(t+N) \\ \vdots & \vdots & \ddots & \vdots \\ u(t+s) & u(t+s+1) & \cdots & u(t+s+N-1) \end{bmatrix} \in R^{l_s \times N}$$

and $$Y_t = [y_s(t+s) y_s(t+s+1) \cdots y_s(t+s+N-1)] \quad (49)$$
$$= \begin{bmatrix} y(t) & y(t+1) & \cdots & y(t+N-1) \\ y(t+1) & y(t+2) & \cdots & y(t+N) \\ \vdots & \vdots & \ddots & \vdots \\ y(t+s) & y(t+s+1) & \cdots & y(t+s+N-1) \end{bmatrix} \in R^{m_s \times N}$$

for $t=1$ and $t=s+1$. Similarly we can define a matrix $$Z_t = [Y_t^T U_t^T]^T$$

From Eqn. 2 it is straightforward to have $$Y_t = \Gamma_s X_t + H_s U_t - H_s V_t + G_s P_t + O_t \quad (50)$$

where $X_t = [x(t) x(t+1) \ldots x(t+N-1)]$, the noise matrices $U_t$, $V_t$ and $O_t$ have the suite block Hankel form as $Y_t$, and the noise terms are finitely correlated according to Eqn. 46.

Setting $t=s+1$ in Eqn. 50 and post-multiplying it by $1/NZ_1^T$ give rise to $$1/NY_{s+1}Z_1^T = 1/N\Gamma_s X_{s+1}Z_1^T + 1/NH_s U_{s+1}Z_1^T - 1/NH_s V_{s+1}Z_1^T + 1/NG_s P_{s+1}Z_1^T + 1/NO_{s+1}Z_1^T \quad (51)$$

We now examine the last three terms of the above equation. These three terms will vanish to zero as $N \to \infty$ because the future noises $V_{s+1}$, $P_{s+1}$, and $O_{s+1}$ are independent of past data $Z_1^T$ (Chou and Verhaegen, 1997). Therefore, we have as $N$ tends to infinity, $$K_{YZ} = \frac{1}{N}\Gamma_s X_{s+1}Z_1^T + H_s K_{UZ} \quad (52)$$

where $$K_{YZ} \equiv \frac{1}{N}Y_{s+1}Z_1^T \in R^{m_s \times (m_s+l_s)}$$

and $$K_{UZ} \equiv \frac{1}{N}U_{s+1}Z_1^T \in R^{l_s \times (m_s+l_s)}$$

Since our objective is to estimate $\Gamma_s^\perp$ and $\Gamma_s^\perp H_s$ from process data, we eliminate the last term in Eqn. 52 by post-multiplying, it with $$\Pi_{UZ}^\perp = I - K_{UZ}^+ K_{UZ},$$

which is a projection to the orthogonal complement of $K_{UZ}$, we obtain, $$K_{YZ}\Pi_{UZ}^\perp = \frac{1}{N}\Gamma_s X_{s+1}Z_1^T \Pi_{UZ}^\perp \quad (53)$$

From Eqn. 53 it is clear that $K_{YZ\Pi_{UZ}^\perp}$ has the same subspace as $\Gamma_s$. Therefore by performing SVD on $K_{YZ}\Pi_{UZ}^\perp$, $$K_{YZ}\Pi_{UZ}^\perp = [U_\Gamma \; U_\Gamma^\perp] \begin{bmatrix} D_\Gamma & 0 \\ 0 & 0 \end{bmatrix} \begin{bmatrix} V_\Gamma & V_\Gamma^\perp \end{bmatrix}^T \quad (54)$$
$$= U_\Gamma D_\Gamma V_\Gamma^T$$

where $D_\Gamma$ is a diagonal matrix containing non-zero singular values of $K_{YZ}\Pi_{UZ}^\perp$, $\Gamma_s^\perp$ can be chosen as $\Gamma_s^\perp = U_\Gamma^\perp$.

After $\Gamma_s^\perp$ is identified, pre-multiplying it on Eqn. 52 gives $$(\Gamma_s^\perp)^T K_{YZ} = (\Gamma_s^\perp)^T H_s K_{UZ} \quad (55)$$

Therefore, $$(\Gamma_s^\perp)^T H_s = (\Gamma_s^\perp)^T K_{YZ} K_{UZ}^+ \quad (56)$$

We note that the pseudo-inverse is necessary when $K_{UZ}$ does not have full row rank. This can happen for collinear input variables or for cases where the inputs are not persistently excited to the order $s+1$. The lack of persistent excitation is typical if the data are collected from normal operations, i.e., without designed experiments. If the data were collected under a designed experiment which makes $K_{UZ}$ full row rank, $K_{UZ}^+ = K_{UZ}^T(K_{UZ}K_{UZ}^T)^{-1}$.

Summarizing the above derivation we formulate the following subspace identification algorithm for estimating $B_s$. Note that this algorithm gives a consistent estimate for $B_s$ under the EIV assumption (Chou and Verhaegen, 1997).

1. Select an initial estimate of the process order n, and set s=n.
2. Formulate data matrices, $Z_1$, $Y_{s+1}$, $U_{s+1}$, and calculate $K_{UZ}$, $K_{YZ}$ and $\Pi_{UZ}^\perp$.
3. Perform SVD on $K_{YZ}\Pi_{UZ}^\perp$ according to Eqn. 54 and set $\Gamma_s^\perp = U_\Gamma^\perp$.
4. Set $n = \dim\{D_\Gamma\}$ and s=n. Repeat steps 2 and 3 once.
5. Calculate $\Gamma_s^\perp H_s$ based on Eqn. 56. The model matrix is given in Eqn. 47.

5 CASE STUDIES

5.1 A Simulated 4×4 Process

To test the effectiveness of the proposed method we simulate a 4×4 dynamic process with two state variables.

The process inputs are perturbed with a multitude of sinusoidal signals with various frequencies. Both input and output variables are subject to measurement noise and the process is subject to process noise, which are shown in FIG. 1. This situation makes it necessary to use errors-in-variables identification methods as proposed in this paper. The noise terms are all Gaussian white noise.

Normal process data are generated and scaled to zero mean and unit variance to apply equal weighting to all variables. Before conducting fault detection and identification, we calculated $\Gamma_s^\perp$, $w_i$ for i=1, ..., 8, and the confidence limits for fault detection and identification indices.

Faulty data are simulated by introducing one of four types of faults: bias, drift, complete failure and precision degradation to one sensor measurements, respectively. In each case, fault occurrence instant $t_f$ is varied.

For each type of faults, after the detection index $\bar{d}(t)$ triggers an alarm, three identification indices are used to identify the faulty sensors. Vsum An EWMA filter with a coefficient $\gamma$=0.98 is applied to generate the FSRs. The GLR and sum indices are calculated based on the unfiltered structured residuals with a moving window of 31 samples.

A bias $f_{y,3}(t)$=0.4 is introduced to the measurements of sensor 3 at $t_f$=400. The fault detection and identification results are shown in FIG. 2: (a) fault detection index; (b) FSRs plotted over time; (d), (f), and (h) box-whisker plots for FSRs, GLR, and Vsum indices against their confidence limits; (c) estimated fault magnitude; (e) original faulty sensor; and (g) reconstructed values for the faulty sensor. The filtered fault detection index effectively detects the fault at t=407. Among all fault identification indices, the FSR and GLR indices are effective in identifying that sensor 3 is the faulty sensor, while the Vsum is not effective as expected.

A drift type fault is introduced to output sensor 2 as follows, $$f_{y,2}(t)=0.02(t-t_f), t \geq t_f \tag{57}$$

where the fault time $t_f$=3.55. The fault detection and identification results are depicted in FIG. 3. Similar to the bias fault case, the FSR and GLR indices are effective in identifying that sensor 2 is the faulty sensor. The Vsum index is not effective at all as expected.

A complete failure is introduced to input sensor 2 by assuming that $u_2(t)$=0.5 is constant after the time instant $t_f$=344. The fault detection and identification results are depicted in FIG. 4. In this case the fault detection index detects the fault at t=345. Further, all three identification indices are effective in uniquely identifying that input sensor 2 (sensor number 6) is the faulty sensor in this case. The fault reconstruction effectively restores the normal values of the input sensor 2.

A variance degradation fault is simulated by adding zero mean Gaussian random sequence with variance $\sigma^2$=4.0 to input sensor 4 at $t_f$=35.5. The fault detection and identification results are depicted in FIG. 5. The fault detection index immediately detects the fault. Among the three identification indices the only effective one is Vsum, which uniquely indicates that the input sensor 4 (sensor number 8) is faulty. In summary, FSR and GLR indices are effective for all types of faults other than variance degradation; Vsum is most effective for variance degradation faults only.

5.2 An Industrial Reactor Process

The proposed fault detection and identification scheme is applied to an industrial reactor process, which has three inputs and three output variables. Raw data are collected, as shown in FIG. 6, and scaled to zero mean and unit variance to apply equal weighting to all variables. Using the subspace algorithm proposed in Section 4, we find that this reactor process can be represented by a third order state space model. Before conducting fault detection and identification, we calculated $\Gamma_s^\perp$, $w_i$ for i=1, ..., 6, and the confidence limits for fault detection and identification indices.

Faulty data are simulated by introducing one of four types of faults: bias, drift, complete failure and precision degradation to one sensor at a time. In each case, the fault occurrence instant $t_f$ is varied.

For each type of faults, after the detection index $\bar{d}(t)$ triggers an alarm, three identification indices are used to identify the faulty sensor. An EWMA filter with a coefficient $\gamma$=0.98 is applied to generate the FSRs. The GLR and Vsum indices are calculated based on the unfiltered structured residuals with a moving window of 31 samples.

A bias $f_{y,3}(t)$=0.1 is introduced to the measurements of sensor 3 at $t_{f\_}900$. The fault detection and identification results are shown in FIG. 7: (a) fault detection index; (b) FSRs plotted over time; (d), (f), and (h) box-whisker plots for FSRs, GLRs, and Vsum indices against their confidence limits; (c) estimated fault magnitude; (e) original faulty sensor; and (g) reconstructed values for the faulty sensor. While the detection index effectively detects the fault at t=918, the FSR index is most effective in identifying the bias fault among the three identification indices. It is seen that sensors 3 and 4 are both below the threshold and are identified as the faulty sensors. Further examination of the process indicates that these two sensors are almost exactly collinear as shown in FIG. 6. Although the identification is not unique, it effectively narrows down the scope for further diagnosis.

A drift type fault is introduced to output sensor 2 as follows.

$$f_{y,2}(t)=0.05(t-t_f), t \geq t_f \tag{58}$$

where the fault time $t_f$=850. The fault detection and identification results are depicted in FIG 8. The fault detection index detects the fault at t=863. Similar to the bias fault case, the FSR index is most effective in identifying that sensors 2 and 5 are possibly faulty. The Vsum index is not effective at all as expected. The fault reconstruction results in sub-figure (g) restore the fault free values, although the reconstruction is noisy.

A complete failure is introduced to input sensor 1 by assuming that $u_1(t)$=18 is constant after the instant to $t_f$=900. The fault detection and identification results are depicted in FIG. 9. In this case the fault detection index detects the fault immediately. The FSR index is most effective in identifying that sensors 3 and 4 are possible faulty sensors. The ambiguity is due to the fact that sensors 3 and 4 are exactly collinear. Vsum index is not effective. The fault reconstruction effectively restores the normal values of sensor 4.

A variance degradation fault is simulated by adding zero mean Gaussian random sequence with variance $\sigma^2$=2.0 to input sensor 2 at $t_f$=900. The fault detection and identification results are depicted in FIG. 10. It is seen that the only effective identification index is Vsum, which uniquely indicates that the input sensor 2 (sensor number 5) is faulty. In summary, FSR is most effective for all types of fault other than variance degradation; Vsum is most effective for variance degradation faults only. The combined use of these indices can help identify the faulty sensors and fault types. Since there are collinearity among some variables, unique identification of faulty sensors may not be possible as demonstrated in this real process.

6 CONCLUSIONS

A novel dynamic sensor fault identification scheme is proposed based on subspace models. We propose an EIV subspace identification algorithm to identify a subspace model suitable for fault detection and identification. The structured residual approach is enhanced with maximized sensitivity to some faults while being decoupled from others. Using the subspace model both the fault detection and fault identification indices are decoupled from the process states, which avoids the need for state estimation. An EWMA filter is used to pre-process the mode residual for fault detection and structured residuals for fault identification in order to reduce the effects of noise in measurements. Methods to determine the alarm thresholds for both fault detection and identification are developed. Four types of sensor faults, bias, drift, complete failure and precision degradation are considered. Three vault identification indices: FSR, GLR, and Vsum are proposed. Comparisons of these indices indicate that Vsum is most effective to variance changes, while FSR is most effective to other types of faults. The proposed method is successfully applied to a simulated dynamic process and an industrial reactor process with satisfactory results. Future work is seen in the derivation of fault identifiability conditions in dynamic systems.

Acknowledgments

The authors acknowledge the technical discussions with Dr. John Guiver from Aspen Tech during the progress of this work.

References

[1] A. Albert. *Regression and the Moore-Penrose Pseudo-inverse*. Academic Press, New York, 1972.

[2] J. S. Albuquerque and L. T. Biegler. Data reconciliation and gross-error detection for dynamic systems. *AIChE J.*, 42:2841, 1996.

[3] T. W. Anderson. *An Introduction to Multivariate Statistical Analysis*. John Wiley and Sons, 1984. Second Edition

[4] M. Basseville and I. V. Nikiforov. *Detection of Abrupt Changes-Theory and Applications*. Prentice-Hall. Englewood Cliffs, N.J., 1993.

[5] A. Benveniste, M. Basseville, and G. Moustakides. The asymptotic local approach to change detection and model validation. *IEEE Trans. Auto. Cont.*, 32(7):583–592, July 1987.

[6] C. T. Chou and Michel Verhaegen. Subspace algorithms for the identification of multi-variable dynamic errors-in-variables models. *Automatica*, 33(10):1857–1869, 1997.

[7] E. Y. Chow and A. S. Willsky. Analytical redundancy and the design of robust failure detection systems. *IEEE Trans. Auto. Cont.*, AC-29:603–614, 1984.

[8] C. M. Crowe. Data reconciliation-progress and challenges. *J. Proc. Cont.*, 6:89–98, 1996.

[9] C. M. Crowe, A. Hrymak, arid Y. A. Garcia Campos. Reconciliation of process flow rates by matrix projection. i, the linear case. *AIChE J.*, 29:881, 1983.

[10] J. C. Deckert, M. N. Desai, J. J. Deyst, and A. S. Willsky. F-8 DFBW sensor failure identification using analytical redundancy. *IEEE Trans. Auto. Cont.*, AC-22:796–803, 1977.

[11] R. Dunia, J. Qin, T. F. Edgar, and T. J. McAvoy. Identification of faulty sensors using principal component analysis. *AIChE J.*, 42:2797–2812, 1996.

[12] P. Fantoni and A. Mazzola. Applications of autoassociative neural networks for signal validation in accident management. In *Proceedings of the IAEA Specialist Meeting on Advanced information Methods and Artificial Intelligence in Nuclear Power Plant Control Rooms*. 1994.

[13] P. M. Frank and X. Ding. Survey of robust residual generation and evaluation methods in observer-based fault detection systems. *J. Proc. Cont.*, 7:403–424, 1997.

[14] P. M. Frank and J. Wunnenberg. Robust fault diagnosis using unknown input observer schemes. In R. Patton, P. Frank, and R. Clark, editors, *Fault Diagnosis in Dynamic Systems*. Prentice-Hall, Englewood Cliffs. N.J., 1989.

[15] J. Gertler and D. Singer. Augmented models for statistical fault isolation in complex dynamic systems. In *Proceedings of the American Control Conference*, pages 317–322, 1985.

[16] J. Gertler and D. Singer, A new structural framework for parity equation based failure detection and isolation. *Automatica*. 6:381–388, 1990.

[17] Janos. Gertler. Analytical redundancy method in fault detection and isolation, survey and synthesis. In *Proceedings of the IFAC SAFEFROCESS Symposium*, 10–13 September 1991.

[18] Janos Gertler, Weihua Li, Yunbing Huang, and Thomas McAvoy. Isolation-enhanced principal component analysis. *AICHE Journal*, 15(2):323–334, 1999.

[19] Janos J. Gertler and Moid M. Kunwer. Optimal residual decoupling for robust fault diagnosis. *Int. J. Control*, 61:395–421, 1995.

[20] A. Hald. *Statistical Theory with Engineering Applications*. John Wile & Sons, Inc., 1952.

[21] T. W. Karjala and D. M. Himmelblau. Dynamic rectification of data via recurrent neural nets and the extended kalman filter. *AIChE J.*, 42:2225, 1996.

[22] J. V. Kresta, J. F. MacGregor, and T. E. Marlin. Multivariate statistical monitoring of processes. *Can. J. Chem. Eng.*, 69(1):35–47, 1991.

[23] M. J. Liebman. T. F. Edgar, and L. S. Lasdon. Efficient data reconciiiation and estimation for dynamic processes using nonlinear programming, techniques *Comput. Chem. Eng.*, 16(10/11):963–986, 1992.

[24] Lennart Ljung. *System Identification: Theory for the User*. Prentice-Hall, Inc., Englewood Cliffs, N.J., 1999.

[25] R. S. H. Mah, G. M. Stanley, and D. Downing. Reconciliation and rectification of process flow and inventory data. *Ind. Eng. Chem. Proc. Des. Dev.*, 15:175, 1976.

[26] P. Miller, R. E. Swanson, and C. F. Heckler. Contribution plots: the missing link in multivariate quality control. In *Fall Conf. Of the ASQC and ASA*, 1993. Milwaukee, Wis.

[27] P. Van Overschee and B. De Moor. N4SID: Subspace algorithms for the identification of combined deterministic-stochastic systems. *Automatica*, 30(1):75, 1994.

[28] S. J. Qin and T. A. Badgwell. An overview of industrial model predictive control technology. In *Chemical Process Control—CPC V*, Tahoe City, Calif., January 1996. CACHE.

[29] S. Joe Qin and Weihua Li. Detection, identification and reconstruction of faulty sensors with maximized sensitivity. *AICHE Journal*, 45:1963–1976, 1999.

[30] D. K. Rollins and J. F. Davis. Unbiased estimation of gross errors in process measurements. *AICHE Journal*, 38:563–572, 1992.

[31] J. A. Romagnoli and G. Stephanopoulos. Rectification of process measurement data in the presence of gross errors. *Chem. Eng. Sci.*, 36(11):1849–1863, 1981.

[32] G. M. Stanley and R. S. H. Mah. Estimation of flows and temperatures in process networks. *AIChE J.*, 23:642–650, 1977.

[33] G. M. Stanley and R. S. H. Mah. Observability and redundancy in process data estimation. *Chem. Eng. Sci.*, 36:2.59–272, 1981.

[34] H. Tong and C. M. Crowe. Detection of gross errors in data reconciliation by principal component analysis. AIChE J., 41:1712–1722, 1995.

[35] Michel Verhaegen. Identification of the deterministic part of MIMO state space models given in innovations form from input-output data. *Automatica.*, 30(1):61–74, 1994.

What is claimed is:

1. An apparatus for detecting one or more sensor faults in a measured process comprising:

A pre-processing unit for receiving a working vector of signals including measured sensor values, the pre-processing unit normalizing the measured sensor values, resulting in pre-processed sensor values;

A model unit coupled to the pre-processing unit, which converts pre-processed sensor values to equation error values that contain mainly measurement noise, said model unit employing dynamic model predictive control techniques;

A structured residual unit coupled to the model unit, which contains a plurality of transforms, referred to as structured residual transforms, each such transform converting equation error values to a structured residual value, and each such transform designed to be insensitive to faults in a subset of sensors;

A detection unit coupled to the model unit, the detection unit monitoring the relationship among the equation error values, occurrence of a significant deviation of said relationship from expected relationship resulting in a detection event;

An identification unit coupled to the structured residual unit and the detection unit, the identification unit being activated by a detection event, and using the structured residual values to determine if one or more sensors are faulty, said determination resulting in an identification event;

An estimation unit coupled to the pre-processing unit, the structured residual unit and the identification unit, the estimation unit being activated by an identification event, and estimating fault sizes for each of the identified faulty sensors;

A replacement unit coupled to the estimation unit, the replacement unit calculating replacement values for the faulty measured sensor values in the working signal values by subtracting the estimated fault size from the corresponding measured sensor value for all identified faults;

A classification unit coupled to the estimation unit, the classification unit being active when the estimation unit is active, and classifying the identified sensor faults into a fixed set of fault types.

2. The apparatus of claim 1 wherein:

The normalizing in the pre-processing units is achieved by scaling and offsetting the measured sensor values.

3. The apparatus of claim 1 wherein:

The working signal includes known status information about the measured sensor values.

4. The apparatus of claim 1 wherein:

Each transform of the structured residual unit is in the form of a vector dot product with the equation error.

5. The apparatus of claim 1 wherein:

Each transform of the structured residual unit is designed to be insensitive to faults in a subset of sensors, but maximally sensitive to faults in all other sensors not in the subset.

6. The apparatus of claim 1 wherein:

Each transform of the structured residual unit is designed to be insensitive to a fault in single sensor, but maximally sensitive to faults in all other sensors.

7. The apparatus of claim 1 wherein:

The subset of sensors defining each transform includes at least all sensors of known bad status.

8. The apparatus of claim 1 wherein the detection unit monitors the relationship among the equation error values by:

calculating a detection index which is a function of the equation errors; and comparing said detection index to a threshold in order to detect occurrence of a significant deviation of said relationship from expected relationship.

9. The apparatus of claim 1 wherein:

The identification unit compares each structured residual value to a corresponding threshold; and An identification event occurs if the value of all but one structured residual value, referred to as the identified structured residual value, exceeds its corresponding threshold; and The determined faulty sensors are the subset of sensors for which, by design, the structured residual transform corresponding to the identified structured residual value is insensitive to the presence of faults in said subset.

10. The apparatus of claim 1 wherein the identification unit applies conversion operations to the structured residual values resulting in converted structured residual indices and The identification unit compares each converted structured residual index to a corresponding threshold; and An identification event occurs if the converted structured residual index of all but one structured residual, referred to as the identified converted structured residual index, exceeds its corresponding threshold; and The determined faulty sensors are the subset of sensors for which, by design, the structured residual transform corresponding the converted structured residual index is insensitive to the presence of faults in said subset.

11. The apparatus of claim 1 wherein the identification unit applies accumulating operations to the structured residual values resulting in accumulated structured residual indices, said operations accumulating since the time of the fault detection event, and The identification unit compares each accumulated structured residual index to a corresponding threshold; and An identification event occurs if the accumulated structured residual index of all but one structured residual, referred to as the identified accumulated structured residual index, exceeds its corresponding threshold; and The determined faulty sensors are the subset of sensors for which, by design, the structured residual transform corresponding to the identified accumulated structured residual index is insensitive to the presence of faults in said subset.

12. The apparatus of claim 1 wherein:

The estimated fault size for each of the identified sensor faults is calculated by minimizing the effect of said identified sensor faults on the equation error values.

13. The apparatus of claim 1 wherein:

The classification unit calculates a plurality of regression lines, one for each identified faulty sensor, each such regression line calculated using the measured sensor values for the corresponding faulty sensor since the time of identification, resulting in a plurality of sensor value regression lines; and The classification unit calculates a plurality of regression lines, one for each identified faulty sensor, each such regression line calculated using estimated fault sizes for the corresponding faulty sensor since the time of identification, result in a plurality of fault size regression lines; and The classification unit uses slope, bias, and residual information from sensor value regression lines and fault size regression lines to classify the identified sensor faults into a fixed set of fault types.

14. A computer method for detecting one or more sensor faults in a measured process which comprises the steps:

Receiving a working vector of signals including measured sensor values, and preprocessing the measured sensor values, resulting in pre-processed sensor values;

Using dynamic model predictive controls, converting the pre-processed sensor values to equation error values that contain mainly measurement noise;

Applying a plurality of transforms to the equation error values resulting in a plurality of structured residual values, said transforms referred to as structured residual transforms and designed to be insensitive to faults in a subset of sensors;

Monitoring the relationship among the equation error values, occurrence of a significant deviation of said relationship from expected relationship resulting in a detection event;

In the case that a detection event occurs, using the structured residual values to determine if one or more sensors are faulty, said determination resulting in an identification event;

In the case that an identification event occurs, estimating fault sizes for each of the identified faulty sensors;

In the case that an identification event occurs, replacing faulty measured sensor values in the working signal with corrected values by subtracting the estimated fault size from the corresponding measured sensor value for all identified faults;

In the case that an identification event occurs, classifying the identified sensor faults into a fixed set of fault types.

15. The method of claim 14 wherein:

The step of pre-processing the measured sensor values is achieved by scaling and offsetting.

16. The method of claim 14 wherein:

The working signal includes known status information about the measured sensor values.

17. The method of claim 14 wherein:

Each structured residual transform includes a vector of coefficients that are applied as a dot product to the equation error.

18. The method of claim 14 wherein:

Each structured residual transform is designed to be insensitive to faults in a subset of sensors, but maximally sensitive to faults in all other sensors not in the subset.

19. The method of claim 14 wherein:

Each structured residual transform is designed to be insensitive to a fault in single sensor, but maximally sensitive to faults in all other sensors.

20. The method of claim 14 wherein:

The subset of sensors defining each transform includes at least all sensors of known bad status.

21. The method of claim 14 wherein the step of monitoring the relationship among the equation error values includes:

calculating a detection index which is a function of the equation errors; and comparing said detection index to a threshold in order to detect occurrence of a significant deviation of said relationship from expected relationship.

22. The method of claim 14 wherein the step of determining if one or more sensors are faulty includes:

Comparing each structured residual value to a corresponding threshold; and

Generating an identification event if the value of all but one structured residual value, referred to as the identified structured residual value, exceeds its corresponding threshold; and Determining that the faulty sensors are the subset of sensors for which, by design, the structured residual transform corresponding to the identified structured residual value is insensitive to the presence of faults in said subset.

23. The method of claim 14 wherein conversion operations are applied to the structured residual values resulting in converted structured residual indices and the step of determining if one or more sensors are faulty includes:

Comparing each converted structured residual index to a corresponding threshold; and Generating an identification event if the converted structured residual index of all but one structured residual, referred to as the identified converted structured residual index, exceeds its corresponding threshold; and Determining that the faulty sensors are the subset of sensors for which, by design, the structured residual transform corresponding the converted structured residual index is insensitive to the presence of faults in said subset.

24. The method of claim 14 wherein accumulating operations are applied to the structured residual values resulting in accumulated structured residual indices, said operations accumulating since the time of the fault detection event, and the step of determining if one or more sensors are faulty includes:

Comparing each accumulated structured residual index to a corresponding threshold; and Generating an identification event if the accumulated structured residual index of all but one structured residual, referred to as the identified accumulated structured residual index, exceeds its corresponding threshold; and Determining that the faulty sensors are the subset of sensors for which, by design, the structured residual transform corresponding to the identified accumulated structured residual index is insensitive to the presence of faults in said subset.

25. The method of claim 14 wherein:

The estimated fault size for each of the identified sensor faults is calculated by minimizing the effect of said identified sensor faults on the equation error values.

26. The method of claim 14 wherein the step of classifying the identified sensor faults into a fixed set of fault types is achieved by:

Calculating a plurality of regression lines, one for each identified faulty sensor, each such regression line calculated using the measured sensor values for the corresponding faulty sensor from the time of identification, resulting in a plurality of sensor value regression lines; and Calculating a plurality of regression lines, one for each identified faulty sensor, each such regression line calculated using estimated fault sizes for the corresponding faulty sensor from the time of identification, result in a plurality of fault size regression lines; and Using slope, bias, and residual information from sensor value regression lines and fault size regression lines to classify the identified sensor faults into a fixed set of fault types.

* * * * *